US012663687B2

(12) United States Patent
Cui et al.

(10) Patent No.: US 12,663,687 B2
(45) Date of Patent: Jun. 23, 2026

(54) SIMULATION METHOD, SIMULATION DEVICE, ELECTRONIC APPARATUS, AND ELECTRONIC PAPER DISPLAY DEVICE

(71) Applicants: Beijing BOE Technology Development Co., Ltd., Beijing (CN); BOE Technology Group Co., Ltd., Beijing (CN)

(72) Inventors: Xiaorong Cui, Beijing (CN); Yuzhen Guo, Beijing (CN); Haoliang Zheng, Beijing (CN); Li Xiao, Beijing (CN); Chenyang Zhang, Beijing (CN); Minghua Xuan, Beijing (CN); Lipeng Gao, Beijing (CN); Jiao Zhao, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 292 days.

(21) Appl. No.: 18/690,813

(22) PCT Filed: Aug. 31, 2023

(86) PCT No.: PCT/CN2023/116195
§ 371 (c)(1),
(2) Date: Mar. 11, 2024

(87) PCT Pub. No.: WO2025/043623
PCT Pub. Date: Mar. 6, 2025

(65) Prior Publication Data
US 2025/0076725 A1    Mar. 6, 2025

(51) Int. Cl.
*G02F 1/1685* (2019.01)
*G02F 1/167* (2019.01)
*G02F 1/1675* (2019.01)

(52) U.S. Cl.
CPC ............ *G02F 1/1685* (2019.01); *G02F 1/167* (2013.01); *G02F 2001/1678* (2013.01)

(58) Field of Classification Search
CPC . G02F 1/1685; G02F 1/167; G02F 2001/1678
See application file for complete search history.

(56) References Cited

U.S. PATENT DOCUMENTS

2011/0249316 A1* 10/2011 Karasawa ............... G02F 1/167
                                                                  359/296
2012/0044128 A1*  2/2012 Joo ....................... G02F 1/1685
                                                                  345/76

* cited by examiner

*Primary Examiner* — James C. Jones
(74) *Attorney, Agent, or Firm* — Westman, Champlin & Koehler, P.A.

(57) ABSTRACT

A simulation method is provided, including: obtaining a model parameter information, including a total charge quantity and respective charge volume densities of various charged particles, and an external electric field force; calculating a built-in electric field intensity by using the model parameter information and a pre-constructed model, where an input of the model includes the total charge quantity and the respective charge volume densities of the various charged particles; calculating, based on the built-in electric field intensity, a built-in electric field force acting on each charged particle; simulating a motion of each charged particle according to the external electric field force and the built-in electric field force acting on each charged particle; and determining a display grayscale under the external electric field force to obtain a simulation relationship between display grayscale and external electric field force, in response to the motion of each charged particle stopping.

20 Claims, 16 Drawing Sheets

0V

1V

4V

W2

W1

A1

7V

W2

A1

W1

W2

A1

W1

12V

W2

A1

W1

18V

W2

A1

W1

SIMULATION METHOD, SIMULATION DEVICE, ELECTRONIC APPARATUS, AND ELECTRONIC PAPER DISPLAY DEVICE

CROSS-REFERENCE TO RELATED APPLICATION(S)

This application is a Section 371 National Stage Application of International Application No. PCT/CN2023/116195, filed on Aug. 31, 2023, entitled "SIMULATION METHOD, SIMULATION DEVICE, ELECTRONIC APPARATUS, AND ELECTRONIC PAPER DISPLAY DEVICE", the content of which is incorporated herein by reference in its entirety.

TECHNICAL FIELD

The present disclosure relates to a field of display technology, and in particular to a simulation method, a simulation device, an electronic apparatus, and an electronic paper display device.

BACKGROUND

At present, electronic paper display devices on the market generally have problems of slow response speed and low refresh rate, and it is needed to develop new electronic paper display devices with faster response and better display effects. However, how to develop electronic paper display devices, improve research and development efficiency, and reduce research and development costs is one of important research topics for research and development personnel.

It should be noted that the information disclosed in the background section is just intended to enhance the understanding of the background of the present disclosure, and therefore may include information that does not constitute a related art known to those skilled in the art.

SUMMARY

In an aspect, a simulation method for an electronic paper display device is provided, including: a model parameter obtaining step of obtaining a model parameter information, where the model parameter information includes a total charge quantity of various charged particles in the electronic paper display device, respective charge volume densities of the various charged particles, and an external electric field force; a built-in electric field intensity calculation step of calculating a built-in electric field intensity of the electronic paper display device by using the model parameter information and a pre-constructed built-in electric field model, where an input of the built-in electric field model includes the total charge quantity of the various charged particles in the electronic paper display device and the respective charge volume densities of the various charged particles, and an output of the built-in electric field model includes the built-in electric field intensity; a built-in electric field force calculation step of calculating, based on the built-in electric field intensity, a built-in electric field force acting on each charged particle in the electronic paper display device; a motion simulation step of simulating a motion of each charged particle in the electronic paper display device according to the external electric field force and the built-in electric field force acting on each charged particle in the electronic paper display device; and a grayscale determination step of determining a display grayscale under the external electric field force to obtain a simulation relationship between display grayscale and external electric field force, in response to the motion of each charged particle in the electronic paper display device stopping.

According to some exemplary embodiments, in the built-in electric field model, the built-in electric field intensity is positively correlated with the total charge quantity of the various charged particles in the electronic paper display device; and/or in the built-in electric field model, the built-in electric field intensity is positively correlated with the respective charge volume densities of the various charged particles.

According to some exemplary embodiments, the various charged particles include display particles used to adjust the display grayscale; and the obtaining a model parameter information includes obtaining a total charge quantity of the display particles.

According to some exemplary embodiments, the display particles include first-color particles and second-color particles; the obtaining a total charge quantity of the display particles includes: estimating a distribution quantity of the first-color particles and a distribution quantity of the second-color particles; calculating a total charge quantity of the first-color particles according to the distribution quantity of the first-color particles and an electric charge of a single first-color particle; calculating a total charge quantity of the second-color particles according to the distribution quantity of the second-color particles and an electric charge of a single second-color particle; and calculating an average value of an absolute value of the total charge quantity of the first-color particles and an absolute value of the total charge quantity of the second-color particles as the total charge quantity of the display particles.

According to some exemplary embodiments, the display particles include single-color particles; and the obtaining a total charge quantity of the display particles includes: estimating a distribution quantity of the single-color particles; and calculating a total charge quantity of the single-color particles according to the distribution quantity of the single-color particles and an electric charge of a single single-color particle.

According to some exemplary embodiments, the display particles include first-color particles, second-color particles, and third-color particles; the obtaining a total charge quantity of the display particles includes: estimating a distribution quantity of the first-color particles, a distribution quantity of the second-color particles, and a distribution quantity of the third-color particles; calculating a total charge quantity of the first-color particles according to the distribution quantity of the first-color particles and an electric charge of a single first-color particle; calculating a total charge quantity of the second-color particles according to the distribution quantity of the second-color particles and an electric charge of a single second-color particle; calculating a total charge quantity of the third-color particles according to the distribution quantity of the third-color particles and an electric charge of a single third-color particle; and calculating an average value of an absolute value of the total charge quantity of the first-color particles, an absolute value of the total charge quantity of the second-color particles and an absolute value of the total charge quantity of the third-color particles as the total charge quantity of the display particles.

According to some exemplary embodiments, the various charged particles further include charged colloidal particles and polarization charges; and the obtaining a model parameter information further includes: obtaining a total charge quantity of the charged colloidal particles; and obtaining a total charge quantity of the polarization charges.

According to some exemplary embodiments, the obtaining a total charge quantity of the various charged particles in the electronic paper display device includes: determining a sum of the total charge quantity of the display particles, the total charge quantity of the charged colloidal particles and the total charge quantity of the polarization charges as the total charge quantity of the various charged particles in the electronic paper display device.

According to some exemplary embodiments, the various charged particles include charged colloidal particles, polarization charges, and display particles used to adjust the display grayscale; and the obtaining a model parameter information includes: obtaining a charge volume density of the display particles; obtaining a charge volume density of the charged colloidal particles; and obtaining a charge volume density of the polarization charges.

According to some exemplary embodiments, the obtaining a charge volume density of the display particles includes: estimating a distribution volume of the first-color particles and a distribution volume of the second-color particles; obtaining a total charge quantity of the display particles; and calculating the charge volume density of the display particles according to the distribution volume of the first-color particles, the distribution volume of the second-color particles, and the total charge quantity of the display particles; and/or the obtaining a charge volume density of the charged colloidal particles includes: estimating a distribution volume of the charged colloidal particles; obtaining a total charge quantity of the charged colloidal particles; and calculating the charge volume density of the charged colloidal particles according to the distribution volume of the charged colloidal particles and the total charge quantity of the charged colloidal particles; and/or the obtaining a charge volume density of the polarization charges includes: estimating a distribution volume of the polarization charges; obtaining a total charge quantity of the polarization charges; and calculating the charge volume density of the polarization charges according to the distribution volume of the polarization charges and the total charge quantity of the polarization charges.

According to some exemplary embodiments, the obtaining a charge volume density of the display particles includes: estimating a distribution volume of the single-color particles; obtaining a total charge quantity of the display particles; and calculating the charge volume density of the display particles according to the distribution volume of the single-color particles and the total charge quantity of the display particles; or the obtaining the charge volume density of the display particles includes: estimating a distribution volume of the first-color particles, a distribution volume of the second-color particles, and a distribution volume of the third-color particles; obtaining a total charge quantity of the display particles; and calculating the charge volume density of the display particles according to the distribution volume of the first-color particles, the distribution volume of the second-color particles, the distribution volume of the third-color particles, and the total charge quantity of the display particles.

According to some exemplary embodiments, the motion simulation step specifically includes: for an $i^{th}$ particle, simulating an accelerated motion of the $i^{th}$ particle and refreshing a position of the $i^{th}$ particle in response to an absolute value of an external electric field force acting on the $i^{th}$ particle being greater than or equal to a sum of an absolute value of a built-in electric field force acting on the $i^{th}$ particle and an absolute value of a resistance acting on the $i^{th}$ particle.

According to some exemplary embodiments, the motion simulation step further specifically includes: for the $i^{th}$ particle, simulating a decelerated motion of the $i^{th}$ particle and refreshing a position of the $i^{th}$ particle in response to the absolute value of the external electric field force acting on the $i^{th}$ particle being less than the sum of the absolute value of the built-in electric field force acting on the $i^{th}$ particle and the absolute value of the resistance acting on the $i^{th}$ particle.

According to some exemplary embodiments, the method further includes: determining a relationship between i and a total number N of particles in the electronic paper display device after simulating the accelerated motion or the decelerated motion of the $i^{th}$ particle; and assigning a value of i+1 to i and repeatedly performing the motion simulation step in response to i not being equal to N.

According to some exemplary embodiments, the method further includes: recalculating the respective charge volume densities of the various charged particles in response to i being equal to N; and repeatedly performing the built-in electric field intensity calculation step, the built-in electric field force calculation step and the motion simulation step based on the recalculated charge volume densities.

According to some exemplary embodiments, the method further includes: for the $i^{th}$ particle, determining a direction of motion of the $i^{th}$ particle in response to the absolute value of the external electric field force acting on the $i^{th}$ particle being less than the sum of the absolute value of the built-in electric field force acting on the $i^{th}$ particle and the absolute value of the resistance acting on the $i^{th}$ particle; and determining that the motion of the $i^{th}$ particle stops, in response to a determination of the direction of motion being reverse.

According to some exemplary embodiments, the built-in electric field model is:

$$E = m\frac{Q}{s} \&\& \rho_1\rho_2\rho_3,$$

where E represents the built-in electric field intensity, m is a predetermined constant, s represents a cross-sectional area parallel to a direction of the built-in electric field of a single display pixel in the electronic paper display device, Q represents the total charge quantity of the various charged particles in the electronic paper display device, $\rho_1$ represents the charge volume density of the display particles, $\rho_2$ represents the charge volume density of the charged colloidal particles, $\rho_3$ represents the charge volume density of the polarization charges, and $\&\&$ is an operational symbol indicating a positive correlation between the built-in electric field intensity E and the charge volume densities $\rho_1$, $\rho_2$ and $\rho_3$ of the various charged particles.

According to some exemplary embodiments, the built-in electric field model is:

$$E = m\frac{Q_1(t)}{s} * f_1(t) + m\frac{Q_2(t)}{s} * f_2(t) + m\frac{Q_3(t)}{s} * f_3(t),$$

where E represents the built-in electric field intensity, m is a predetermined constant, s represents a cross-sectional area parallel to a direction of the built-in electric field of a single display pixel in the electronic paper display device, $Q_1(t)$ represents the total charge quantity of the display particles at time t, $f_1(t)$ represents the charge volume density of the display particles at time t, $Q_2(t)$ represents the total charge quantity of the charged colloidal particles at time t, $f_2(t)$ represents the charge volume density of the charged colloidal particles at time t, $Q_3(t)$ represents the total charge quantity of the polarization charges at time t, and $f_3(t)$ represents the charge volume density of the polarization charges at time t.

According to some exemplary embodiments, the charge volume density $f_1(t)$ of the display particles at time t is calculated by:

$$f_1(t) = \frac{Q_1(t)}{(V_{P1}(t) + V_{P2}(t))^{z1}},$$

where $V_{P1}(t)$ represents the distribution volume of the first-color particles at time t, $V_{P2}(t)$ represents the distribution volume of the second-color particles at time t, and z1 is a first volume correction coefficient; and/or the charge volume density $f_2(t)$ of the charged colloidal particles at time t is calculated by:

$$f_2(t) = \frac{Q_2(t)}{(V_{C1}(t) + V_{C2}(t))^{z2}},$$

where $V_{C1}(t)$ represents a distribution volume of positively charged colloidal particles at time t, $V_{C2}(t)$ represents a distribution volume of negatively charged colloidal particles at time t, and z2 is a second volume correction coefficient; and/or the charge volume density $f_3(t)$ of the polarization charges at time t is calculated by:

$$f_3(t) = \frac{Q_3(t)}{(V_{PL1}(t) + V_{PL2}(t))^{z3}},$$

where $V_{PL1}(t)$ represents a distribution volume of positive polarization charges at time t, $V_{PL2}(t)$ represents a distribution volume of negative polarization charges at time t, and z3 is a third volume correction coefficient.

In another aspect, a simulation device for an electronic paper display device is provided, including: a model parameter obtaining module configured to obtain a model parameter information, where the model parameter information includes a total charge quantity of various charged particles in the electronic paper display device, respective charge volume densities of the various charged particles, and an external electric field force; a built-in electric field intensity calculation module configured to calculate a built-in electric field intensity of the electronic paper display device by using the model parameter information and a pre-constructed built-in electric field model, where an input of the built-in electric field model includes the total charge quantity of the various charged particles in the electronic paper display device and the respective charge volume densities of the various charged particles, and an output of the built-in electric field model includes the built-in electric field intensity; a built-in electric field force calculation module configured to calculate, based on the built-in electric field intensity, a built-in electric field force acting on each charged particle in the electronic paper display device; a motion simulation module configured to simulate a motion of each charged particle in the electronic paper display device according to the external electric field force and the built-in electric field force acting on each charged particle in the electronic paper display device; and a grayscale determination module configured to determine a display grayscale under the external electric field force to obtain a simulation relationship between display grayscale and external electric field force, in response to the motion of each charged particle in the electronic paper display device stopping.

In another aspect, an electronic apparatus is provided, including: one or more processors; a storage device for storing one or more programs, where the one or more programs, when executed by the one or more processors, cause the one or more processors to perform the method described above.

In another aspect, an electronic paper display device is provided, where a relationship between display grayscale and external electric field force of the electronic paper display device is determined based on the method described above.

According to some exemplary embodiments, the electronic paper display device includes: a base substrate; a first electrode provided on the base substrate; a second electrode provided on a side of the first electrode away from the base substrate; and charged particles provided between the first electrode and the second electrode; the charged particles are configured to be driven to a display side under an action of an external electric field applied between the first electrode and the second electrode, so as to achieve a display grayscale meeting the relationship between display grayscale and external electric field force.

BRIEF DESCRIPTION OF THE DRAWINGS

The above contents and other objectives, features and advantages of the present disclosure will be more apparent through the following descriptions of embodiments of the present disclosure with reference to the accompanying drawings. In the accompanying drawings:

FIG. 6A shows initial states of various charged particles, FIG. 6B shows an early state of various charged particles in an early stage of applying a positive voltage, FIG. 6C shows a steady state of various charged particles when the applied positive voltage reaches a steady state, FIG. 6D shows an early state of various charged particles after voltage switching, FIG. 6E shows a mid-term state of various charged particles after voltage switching, and FIG. 6F shows a steady state of various charged particles after voltage switching;

Figure 1:
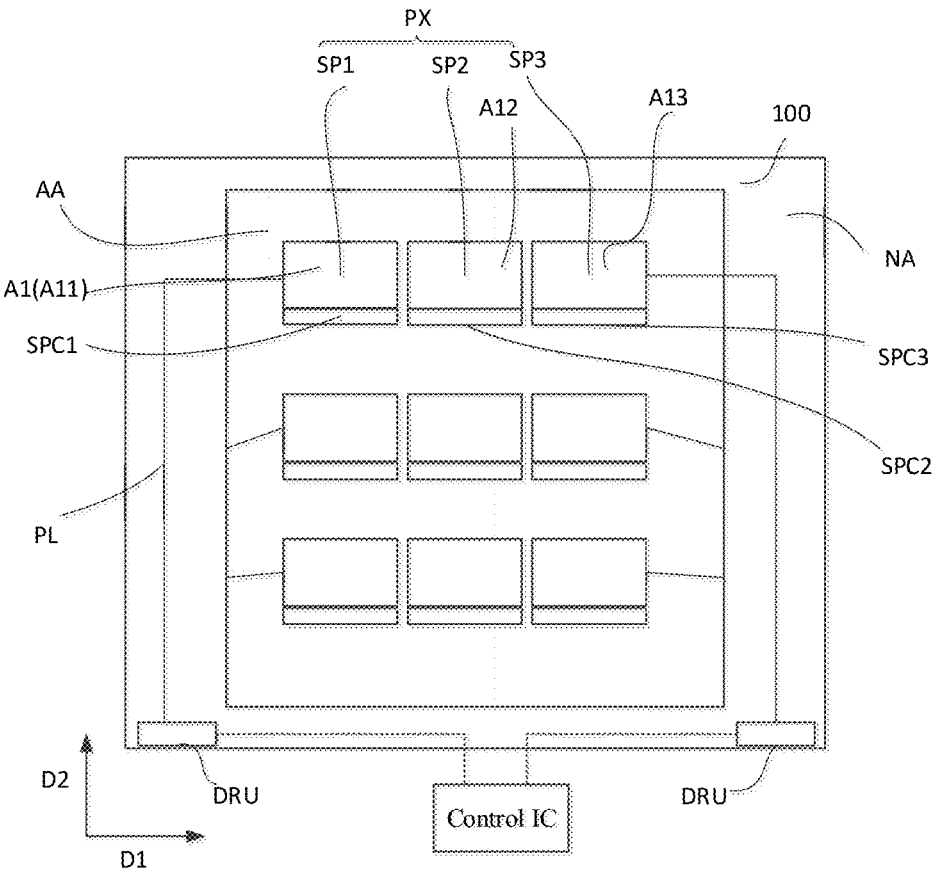
FIG. 1 shows a schematic planar view of an electronic paper display device according to embodiments of the present disclosure.

It should be noted that for the sake of clarity, in the accompanying drawings used to describe the embodiments of the present disclosure, sizes of layers, structures or regions may be enlarged or reduced, that is, those accompanying drawings are not drawn according to actual scale.

DETAILED DESCRIPTION OF EMBODIMENTS

In order to make objectives, technical solutions and advantages of the embodiments of the present disclosure clearer, technical solutions of the embodiments of the present disclosure will be clearly and completely described below with reference to the accompanying drawings. Obviously, the described embodiments are just some embodiments rather than all embodiments of the present disclosure. Based on the described embodiments of the present disclosure, all additional embodiments obtained by those ordinary skilled in the art without carrying out inventive effort fall within the scope of protection of the present disclosure.

It should be noted that in the accompanying drawings, for clarity and/or description purposes, a size and relative size of an element may be enlarged. Accordingly, the size and relative size of each element are not necessarily limited to those shown in the figures. In the specification and the accompanying drawings, the same or similar reference numerals represent the same or similar components.

Unless otherwise defined, the technical or scientific terms used in the embodiments of the present disclosure should have the usual meanings understood by those skilled in the art. The words "first", "second" or the like used in the embodiments of the present disclosure do not indicate any order, quantity or importance, but are just used to distinguish different composition parts. The words "including", "containing" or the like mean that an element or object preceding the words cover an element or object or equivalents following the words, but do not exclude other elements or objects.

Herein, unless otherwise specified, directional terms such as "upper", "lower", "left", "right", "inside", "outside", etc. are used to indicate orientations or positional relationships shown based on the accompanying drawings, which is intended to facilitate the descriptions of the present disclosure and not to indicate or imply that the device, element or component referred to must have a specific orientation or must be constructed or operated in a specific orientation. It should be understood that when an absolute position of a described object changes, the relative positional relationships indicated by those terms may also change accordingly.

Therefore, those directional terms may not be understood as limitations to the present disclosure.

Herein, the directional expressions "first direction" and "second direction" are used to describe different directions along a pixel unit, e.g., a longitudinal direction and a transverse direction of the pixel unit, or a row direction and a column direction in which the sub-pixels are arranged. It should be understood that such expressions are just exemplary descriptions and not limitations to the present disclosure.

Electronic paper is actually a thin display device, and its main structure may include two parts. One part is electronic ink, sometimes also known as a front panel. The other part, also known as a backboard, mainly includes a circuit assembly used to allow an electronic ink page to generate a text or an image. The electronic ink contains a large number of microcapsules. Each microcapsule is mainly composed of transparent liquid, which carries a large number of white negatively charged particles and black positively charged particles. When a positive electric field is applied to the front panel of the electronic paper, the white particles move to a top of the microcapsule and a white dot is shown to a reader, while the black particles sink to a bottom of the microcapsule and disappear from reader's eyes. When an opposite electric field is applied, the black electron particles may move to the top of the microcapsule and the white electron particles may sink to the bottom of the microcapsule, then a black text or image is formed. Electronic paper display technology may be determined by a bottom selective electrode to present a gray color composed of partial black electron particles and partial white electron particles, so that a certain level of contrast may be displayed.

Based on a principle of the electronic paper, each microcapsule contains a plurality of particles. If particles of colors such as cyan, magenta, and yellow are mixed in the electronic paper display device, a display effect of full color gamut may be achieved, which is a color ink screen. An electronic paper display device that uses a color ink screen may also display a colorful text or image.

It should be noted that the electronic ink may contain charged particles of two different colors for a dual color display device; and may also contain charged particles of a single color for a monochromatic display device; and/or the electronic ink may also include charged particles of more colors, such as charged particles of three colors, which may include first-color particles, second-color particles, and third-color particles. For example, the first-color particles may be red charged particles, the second-color particles may be yellow charged particles, and the third-color particles may be cyan charged particles. Types and quantities of charged color particles may be designed according to a specific display effect of the display device, which is not limited in the present disclosure.

In order to improve the efficiency of electronic paper development and reduce research and development costs, a simulation model may be constructed to calculate a corresponding relationship between a voltage applied to electrodes and a display grayscale of electronic paper, which may effectively help researchers to develop and design electronic paper display devices. Due to the lack of mature electronic ink simulation software on the market, current simulations of electronic ink systems mainly rely on self-built models. An electronic ink system is complex, for example, sizes and surface charges of black and white particles, viscosity and dielectric substance of transmission medium, magnitude of charged colloidal particles and polarization, relationship between external electric field and cell thickness, and solid content of black and white particles, etc., may all affect the display effect and steady-state performance of an electronic paper display device. At present, one of difficulties in the simulation in this field is a complex internal force process of the electronic ink system under an external electric field, and a final distinction of grayscales under different voltages.

Some exemplary embodiments of the present disclosure provide a simulation method for an electronic paper display device, including: a model parameter obtaining step of obtaining a model parameter information, where the model parameter information includes a total charge quantity of various charged particles in the electronic paper display device, respective charge volume densities of the various charged particles, and an external electric field force; a built-in electric field intensity calculation step of calculating a built-in electric field intensity of the electronic paper display device by using the model parameter information and a pre-constructed built-in electric field model, where an input of the built-in electric field model includes the total charge quantity of the various charged particles in the electronic paper display device and the respective charge volume densities of the various charged particles, and an output of the built-in electric field model includes the built-in electric field intensity; a built-in electric field force calculation step of calculating, based on the built-in electric field intensity, a built-in electric field force acting on each charged particle in the electronic paper display device; a motion simulation step of simulating a motion of each charged particle in the electronic paper display device according to the external electric field force and the built-in electric field force acting on each charged particle in the electronic paper display device; and a grayscale determination step of determining a display grayscale under the external electric field force to obtain a simulation relationship between display grayscale and external electric field force, in response to the motion of each charged particle in the electronic paper display device stopping. By constructing a variable built-in electric field calculation model, it is possible to participate in the force process of particles in real time as the particles move, and ultimately achieve a force balance state of various charged particles, thereby achieving a simulation of a voltage-grayscale relationship in the electronic ink system. With such model, it is possible to quickly and efficiently simulate an initial steady-state of the electronic ink system, so that an efficiency of device development may be improved.

FIG. 1 shows a schematic planar view of an electronic paper display device according to embodiments of the present disclosure.

Referring to FIG. 1, the electronic paper display device according to the embodiments of the present disclosure may include a base substrate 100, a pixel unit PX provided on the base substrate 100, a driving unit DRU provided on the base substrate 100, and a wire PL that electrically connects the pixel unit PX and the driving unit DRU. The driving unit DRU is used to drive the pixel unit PX.

The display device may include a display region AA and a non-display region NA. The display region AA may be a region in which a pixel unit PX for displaying an image is provided. The non-display region NA may be a region in which no pixel unit PX is provided, that is, a region in which no image is displayed. The driving unit DRU used to drive the pixel unit PX and some wires PL that connect the pixel unit PX and the driving unit DRU may be arranged in the non-display region NA. The non-display region NA corresponds to a bezel in a final display device, and a width of the bezel may be determined according to a width of the non-display region NA.

The display region AA may have various shapes. For example, the display region AA may be provided in various shapes such as a closed polygon including straight sides (e.g., a rectangle), a circle, an ellipse, etc. that includes a curved side, and a semicircle, a semi-ellipse, etc. that includes a straight side and a curved side. In the embodiments of the present disclosure, the display region AA is provided as a region having a quadrangular shape including straight sides. It should be understood that this is just an exemplary embodiment of the present disclosure, rather than a limitation to the present disclosure.

The non-display region NA may be arranged on at least one side of the display region AA. In the embodiments of the present disclosure, the non-display region NA may surround a periphery of the display region AA. In the embodiments of the present disclosure, the non-display region NA may include a transverse portion extending in a first direction D1 and a longitudinal portion extending in a second direction D2.

The pixel unit PX is arranged in the display region AA. The pixel unit PX is a minimum unit for displaying an image, and a plurality of pixel units may be provided. For example, the pixel unit PX may include microcapsules displaying white and/or black.

A plurality of pixel units PX may be arranged in a matrix form along rows extending in the first direction D1 and columns extending in the second direction D2. However, the embodiments of the present disclosure do not specifically limit an arrangement form of the pixel units PX, and the pixel units PX may be arranged in various forms. For example, the pixel units PX may be arranged such that a direction inclined with respect to the first direction D1 and the second direction D2 is a column direction, and a direction intersecting with the column direction is a row direction.

A pixel unit PX may include a plurality of sub-pixels. For example, a pixel unit PX may include three sub-pixels, namely a first sub-pixel SP1, a second sub-pixel SP2, and a third sub-pixel SP3. For another example, a pixel unit PX may include four sub-pixels, namely a first sub-pixel SP1, a second sub-pixel SP2, a third sub-pixel SP3, and a fourth sub-pixel. For example, the first sub-pixel SP1 may be a white sub-pixel, the second sub-pixel SP2 may be a black sub-pixel, and the third sub-pixel SP3 may be a color sub-pixel.

Each sub-pixel may include a display element and a pixel driving circuit for driving the display element. For example, the first sub-pixel SP1 may include a first display element A11 and a first pixel driving circuit SPC1 for driving the first display element, and the first display element A11 may display white; the second sub-pixel SP2 may include a second display element A12 and a second pixel driving circuit SPC2 for driving the second display element A12, and the second display element may display black; the third sub-pixel SP3 may include a third display element A13 and a third pixel driving circuit SPC3 for driving the third display element A13, and the third display element may display color.

Figure 2A:
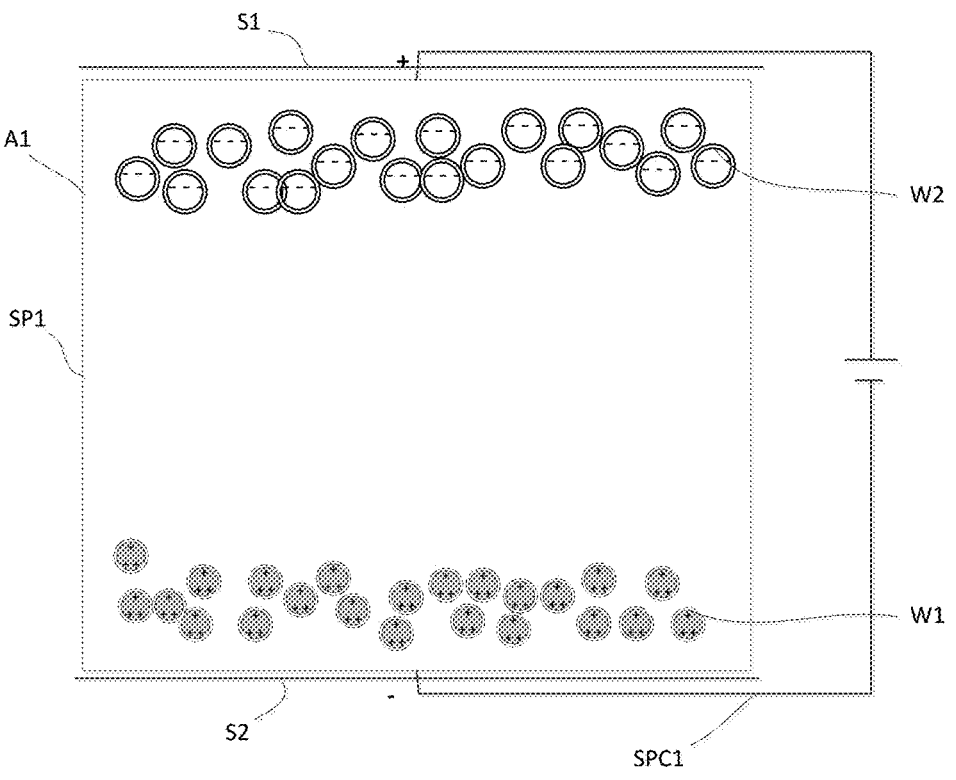
FIG. 2A and FIG. 2B show schematic diagrams of a display principle of a single sub-pixel of an electronic paper display device according to embodiments of the present disclosure.
Figure 2B:
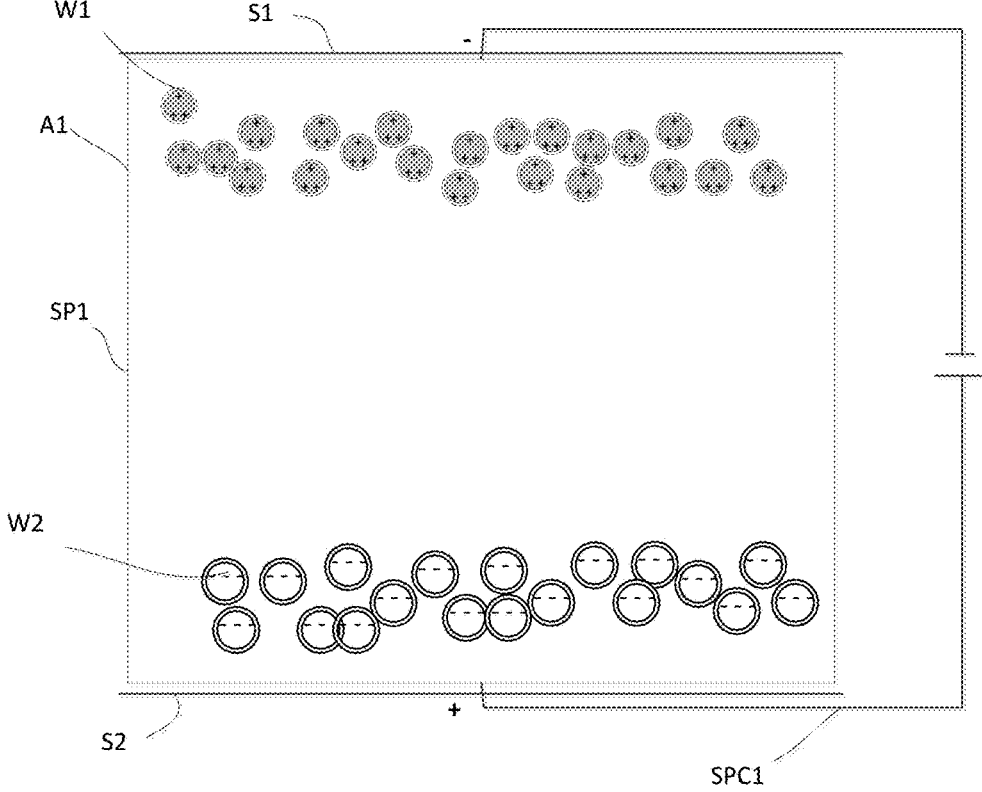

FIG. 2A and FIG. 2B show schematic diagrams of a display principle of a single sub-pixel of the electronic paper display device according to embodiments of the present disclosure.

In some exemplary embodiments of the present disclosure, with reference to FIG. 1 and FIG. 2A, the electronic paper display device may include a plurality of pixel units PX, and a pixel unit PX may include a plurality of sub-pixels, such as a first sub-pixel SP1, a second sub-pixel SP2, and a third sub-pixel SP3. A single sub-pixel, such as the first sub-pixel SP1, may include a display element A1 and a pixel driving circuit SPC1 for driving the display element A1. The display element A1 may include a plurality of charged particles, such as a plurality of positively charged black particles W1 and a plurality of negatively charged white particles W2. The pixel driving circuit SPC1 may include two thin film electrodes S1 and S2, and the display element A1 may be located between the two thin film electrodes. When an external electric field is applied to the thin film electrodes on both sides of the display element A1, for example, when a negative voltage is applied to the thin film electrode S2 on a side close to the base substrate and the thin film electrode S2 acts as a negative electrode while a positive voltage is applied to the thin film electrode S1 on a side away from the base substrate and close to a light emitting side and the thin film electrode S1 acts as a positive electrode, the plurality of charged particles in the display element may move accordingly under the action of the external electric field. For example, the negatively charged white particles W2 may move towards a side of the positive electrode, while the positively charged black particles W1 may move towards a side of the negative electrode. The stronger the external electric field applied, the faster the corresponding charged particles move, then the more nega-tively charged white particles W2 accumulate on the side close to the light emitting direction, so that white is shown.

If the direction of the external electric field is changed, as shown in FIG. 2B, for example, if a positive voltage is applied to the thin film electrode S2 on the side close to the base substrate and the thin film electrode S2 acts as the positive electrode while a negative voltage is applied to the thin film electrode S1 on the side away from the base substrate and close to the light emitting direction and the thin film electrode S1 acts as the negative electrode, the motion of the charged particles in the display element may also change according to the change of the external electric field. For example, the negatively charged white particles W2 may move towards the side of the positive electrode, while the positively charged black particles W1 may move towards the side of the negative electrode. The stronger the external electric field applied, the faster the corresponding charged particles move, then the more positively charged black particles W1 accumulate on the side close to the light emitting direction, so that black is shown.

By changing the external electric field, it is possible to control a suspension and sinking of different charged par-ticles between the two thin film electrodes S1 and S2, so that charged particles of different colors are arranged in an orderly manner, and the display element A1 may be con-trolled to show a visualization effect of different colors. Different electric fields may result in different motion states of different charged particles, and thus result in different colors and charge volume densities of particles on the side away from the base substrate and close to the light emitting direction when the charged particles reach a balance. Accordingly, the display element A1 may present different display effects. Therefore, it is possible to distinguish dif-ferent grayscales of electronic paper by adjusting the exter-nal electric field.

Figure 3A:
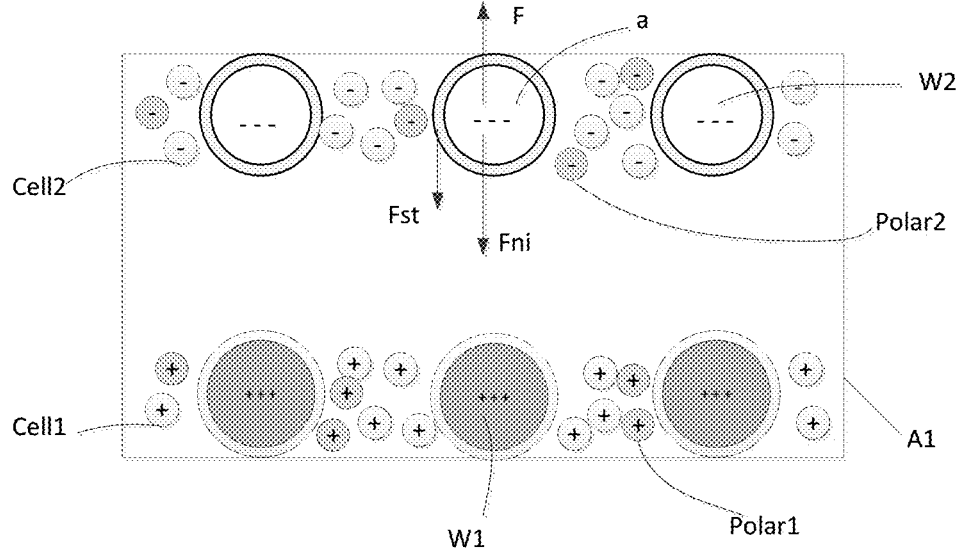
FIG. 3A shows a schematic planar view of a display element according to some embodiments of the present disclosure, in which a plurality of types of charged particles are shown.
Figure 3B:
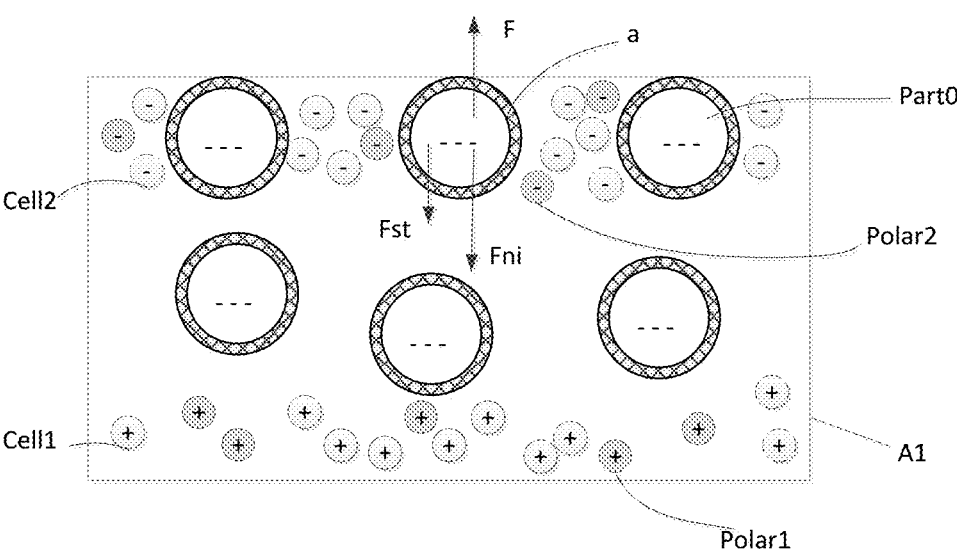
FIG. 3B shows a schematic planar view of a display element according to some embodiments of the present disclosure, in which single-color particles are shown.
Figure 3C:
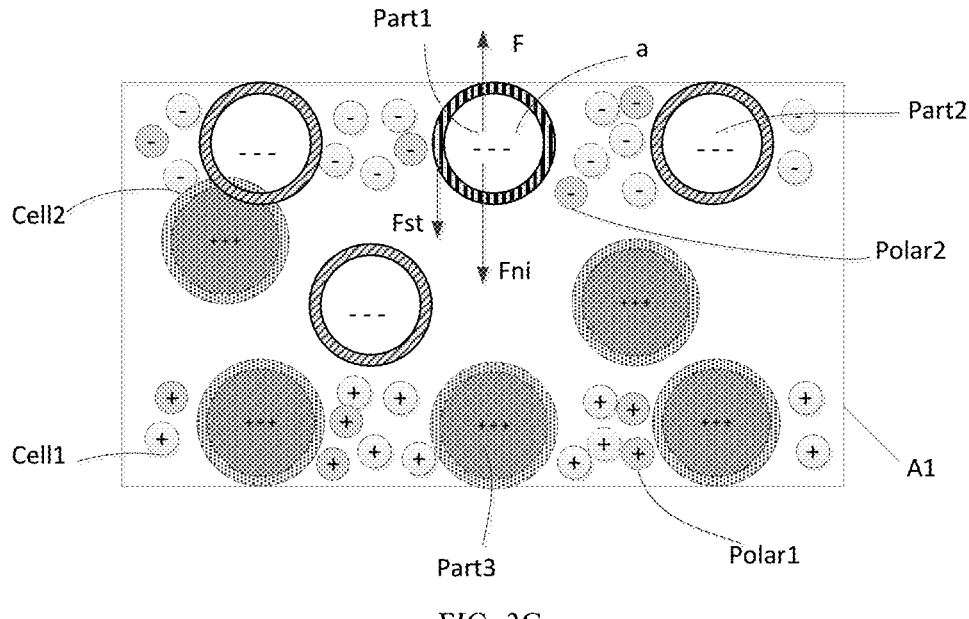
FIG. 3C shows a schematic planar view of a display element according to some embodiments of the present disclosure, in which charged particles of three colors are shown.

FIG. 3A shows a schematic planar view of a display element according to some embodiments of the present disclosure, in which charged particles of two colors are shown. FIG. 3B shows a schematic planar view of a display element according to some embodiments of the present disclosure, in which single-color particles are shown. FIG. 3C shows a schematic planar view of a display element according to some embodiments of the present disclosure, in which charged particles of three colors are shown.

The display element A1 may not only include a plurality of positively charged black particles W1 and a plurality of negatively charged white particles W2, but also a plurality of other charged particles, such as a plurality of charged colloidal particles Cell or a plurality of polarization charges Polar. The plurality of other charged particles may also move with the applied external electric field. Referring to FIG. 3A, when the plurality of white particles W2 and the plurality of black particles W1 gradually move towards both sides under the action of the electric field force, the charged colloidal particles Cell and the polarization charges Polar with the same polarity charge and smaller volume may also move towards both sides of the electrodes. The polarization charges Polar and the charged colloidal particles Cell may aggregate in a gap region of the white particles W2 or the black particles W1. The charged colloidal particles Cell include positively charged colloidal particles Cell1 and negatively charged colloidal particles Cell2, and the polar-ization charges Polar include positively charged polarization charges Polar1 and negatively charged polarization charges Polar2.

The various charged particles, such as the black particles W1, the white particles W2, the positively charged colloidal particles Cell1, the negatively charged colloidal particles Cell2, the positively charged polarization charges Polar1 and the negatively charged polarization charges Polar2, may establish a built-in electric field E in the display element A1. When the external electric field does not change, the various charged particles may gradually form a balance state from a motion state under a combined action of the external electric field E0 and the built-in electric field E. At this time, the number and volume of charged particles on the side close to the light emitting direction are relatively stable, so that a display effect of a specific grayscale corresponding to the external electric field is presented. Therefore, by construct-ing a variable built-in electric field model, it is possible to participate in the force process of charged particles in real time as the charged particles move, and ultimately achieve a force balance of the various charged particles such as the black particles W1 and the white particles W2, thereby achieving a simulation of the voltage-grayscale relationship in the electronic ink system. With such simulation model, it is possible to quickly and efficiently achieve the simulation calculation for the initial steady-state of the electronic ink system, which is beneficial for improving the efficiency of device development and reducing research and development cycles and costs.

It should be noted that the display particles used to adjust the display grayscale may not only include black and white particles, but also display particles of other colors, such as those with cyan, magenta, yellow, and other colors. It should also be noted that the display particles used to adjust the display grayscale may include single-color display particles, for example, only black particles or only white particles.

For example, referring to FIG. 3B, the display particles used to adjust the display grayscale may include single-color particles Part0. It is possible to achieve a monochromatic display by adjusting a distribution of the single-color par-ticles Part0 in different regions. Referring to FIG. 3C, the display particles used to adjust the display grayscale may also include charged particles of three colors, such as first-color particles Part1, second-color particles Part2, and third-color particles Part3. For example, in the charged particles of three colors, charged particles of two colors may be negatively charged and charged particles of one color may be positively charged; or charged particles of two colors may be positively charged and charged particles of one color may be negatively charged. The color types and the number of color types of the display particles are not limited in the present disclosure.

Figure 4:
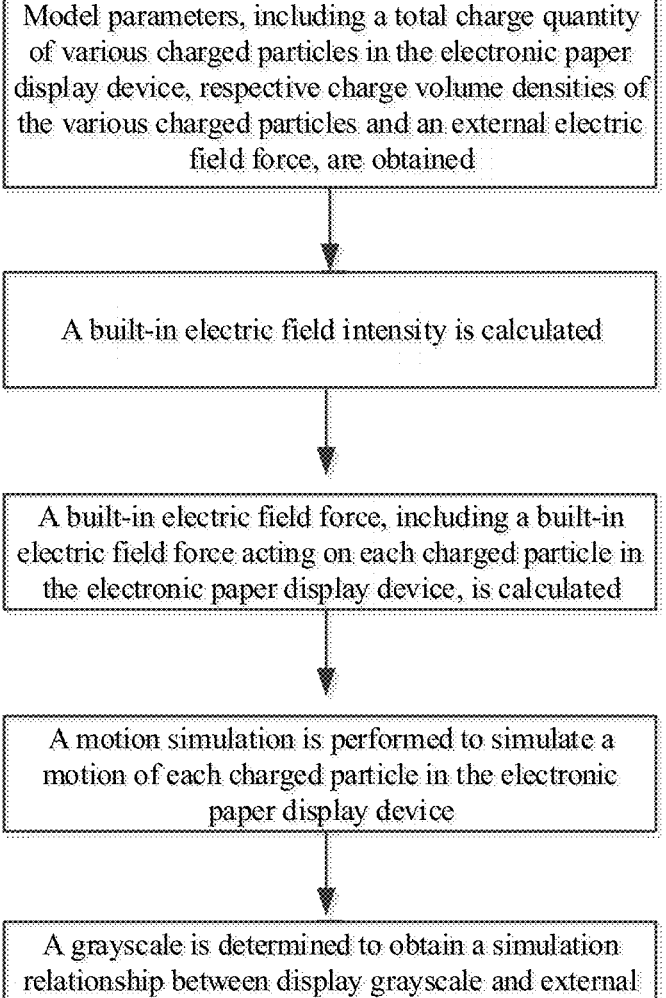
FIG. 4 shows a flowchart of a simulation method for an electronic paper display device according to some embodiments of the present disclosure.

FIG. 4 shows a flowchart of a simulation method for an electronic paper display device according to some embodiments of the present disclosure.

Optionally, embodiments of the present disclosure provide a simulation method for an electronic paper display device. Referring to FIG. 4, the method includes steps S001-S005.

In step S001, a model parameter is obtained, which includes obtaining a model parameter information. The model parameter information includes a total charge quantity Q of various charged particles in the electronic paper display device, respective charge volume densities of the various charged particles, and an external electric field force F.

In step S002, a built-in electric field intensity E is calculated. The built-in electric field intensity E of the electronic paper display device is calculated by using the model parameter information and a pre-constructed built-in electric field model. An input of the built-in electric field model includes the total charge quantity Q of the various charged particles in the electronic paper display device and the respective charge volume densities of the various charged particles. An output of the built-in electric field model includes the built-in electric field intensity E.

In step S003, a built-in electric field force Fni is calculated. The built-in electric field force Fni acting on each charged particle in the electronic paper display device is calculated based on the built-in electric field intensity E.

In step S004, a motion simulation is performed to simulate a motion of each charged particle in the electronic paper display device according to the external electric field force F and the built-in electric field force Fni acting on each charged particle in the electronic paper display device.

In step S005, a grayscale is determined. When the motion of each charged particle in the electronic paper display device stops, a display grayscale under the external electric field force F is determined to obtain a simulation relationship between display grayscale and external electric field force.

By constructing a variable built-in electric field model, it is possible to participate in the force process of charged particles in real time as the particles move, and ultimately achieve a force balance state of various charged particles such as black particles W1 and white particles W2, thereby achieving a simulation of a voltage-grayscale relationship in the electronic ink system. With such simulation model, it is possible to quickly and efficiently achieve a simulation calculation of an initial steady-state of the electronic ink system, which is beneficial for improving device development efficiency and reducing research and development cycles and costs.

Optionally, in some exemplary embodiments of the present disclosure, in the built-in electric field model, the built-in electric field intensity E is positively correlated with the total charge quantity Q of the various charged particles in the electronic paper display device; and/or in the built-in electric field model, the built-in electric field intensity is positively correlated with the respective charge volume densities of the various charged particles. That is to say, when a volume of the electronic paper display device is fixed, the greater the total charge quantity Q of the various charged particles within a same volume in the electronic paper display device, the stronger the built-in electric field intensity E established according to the built-in electric field model; and/or when the number of charged particles and the charge types in the electronic paper display device remain unchanged while the volume of the electronic paper display device decreases, the respective charge volume densities of the various charged particles in the electronic paper display device may increase, and the built-in electric field may increase accordingly. For example, the various charged particles in the electronic paper display device include display particles Part, charged colloidal particles Cell, polarization charges Polar and other charged particles. When the charge quantity of the charged particles such as the display particles Part, the charged colloidal particles Cell and the polarization charges Polar remains unchanged while the volume of the electronic paper display device decreases, a charge volume density $\rho_1$ of the display particles Part may increase, and the corresponding built-in electric field may also increase; and/or a charge volume density $\rho_2$ of the charged colloidal particles Cell may increase, and the corresponding built-in electric field may also increase; and/or a charge volume density $\rho_3$ of the polarization charges Polar may increase, and the corresponding built-in electric field may also increase.

Optionally, in some exemplary embodiments of the present disclosure, the various charged particles include display particles Part used to adjust the display grayscale.

Optionally, the display particles Part may include first-color particles Part1 and second-color particles Part2.

Optionally, obtaining the model parameter information includes obtaining a total charge quantity $Q_1$ of the display particles Part.

Optionally, obtaining the total charge quantity $Q_1$ of the display particles Part includes: estimating a distribution quantity of the first-color particles Part1 and a distribution quantity of the second-color particles Part2; calculating a total charge quantity $Q_{11}$ of the first-color particles according to the distribution quantity of the first-color particles Part1 and an electric charge of a single first-color particle Part1; calculating a total charge quantity $Q_{12}$ of the second-color particles according to the distribution quantity of the second-color particles Part2 and an electric charge of a single second-color particle Part2; and calculating an average value of an absolute value of the total charge quantity $Q_{11}$ of the first-color particles Part1 and an absolute value of the total charge quantity $Q_{12}$ of the second-color particles Part2 as the total charge quantity $Q_1$ of the display particles Part. That is to say, the total charge quantity $Q_1$ of the display particles Part meet the following calculation formula: $Q_1 = (|Q_{11}| + |Q_{12}|)/2$.

It should be noted that the electric charge of a single particle may be obtained using some well-known measurement or calculation methods, which will not be described in detail here.

Optionally, the display particles Part may include single-color particles. In such embodiments, obtaining the total charge quantity $Q_1$ of the display particles Part may include: estimating a distribution quantity of the single-color particles; and calculating a total charge quantity of the single-color particles according to the distribution quantity of the single-color particles and an electric charge of a single single-color particle.

Optionally, the display particles Part may only include single-color particles Part0. Obtaining the model parameter information includes: obtaining the total charge quantity $Q_1$ of the display particles Part. Obtaining the total charge quantity $Q_1$ of the display particles Part includes: estimating a distribution quantity of the single-color particles Part0; calculating a total charge quantity $Q_0$ of the single-color particles according to the distribution quantity of the single-color particles Part0 and an electric charge of a single single-color particle Part0; and determining an absolute value of the total charge quantity $Q_0$ of the single-color particles as the total charge quantity $Q_1$ of the display particles Part. That is to say, the total charge quantity $Q_1$ of the display particles Part meet the following calculation formula: $Q_1 = |Q_0|$.

Optionally, the display particles Part may include first-color particles, second-color particles, and third-color particles. In such embodiments, obtaining the total charge quantity $Q_1$ of the display particles Part may include: estimating a distribution quantity of the first-color particles, a distribution quantity of the second-color particles, and a distribution quantity of the third-color particles; calculating a total charge quantity of the first-color particles according to the distribution quantity of the first-color particles and an electric charge of a single first-color particle; calculating a total charge quantity of the second-color particles according to the distribution quantity of the second-color particles and an electric charge of a single second-color particle; calculating a total charge quantity of the third-color particles according to the distribution quantity of the third-color particles and an electric charge of a single third-color particle; and calculating an average value of an absolute value of the total charge quantity of the first-color particles, an absolute value of the total charge quantity of the second-color particles and an absolute value of the total charge quantity of the third-color particles as the total charge quantity of the display particles.

Optionally, the display particles Part may include first-color particles Part1, second-color particles Part2, and third-color particles Part3. Obtaining the model parameter information includes obtaining the total charge quantity $Q_1$ of the display particles Part. Obtaining the total charge quantity $Q_1$ of the display particles Part includes: estimating a distribution quantity of the first-color particles Part1, a distribution quantity of the second-color particles Part2, and a distribution quantity of the third-color particles Part3; calculating a total charge quantity $Q_{11}$ of the first-color particles according to the distribution quantity of the first-color particles Part1 and an electric charge of a single first-color particle Part1; calculating a total charge quantity $Q_{12}$ of the second-color particles according to the distribution quantity of the second-color particles Part2 and an electric charge of a single second-color particle Part2; calculating a total charge quantity $Q_{13}$ of the third-color particles according to the distribution quantity of the third-color particles Part3 and an electric charge of a single third-color particle Part3; and calculating an average value of an absolute value of the total charge quantity $Q_{11}$ of the first-color particles Part1, an absolute value of the total charge quantity $Q_{12}$ of the second-color particles Part2 and an absolute value of the total charge quantity $Q_{13}$ of the third-color particles Part3 as the total charge quantity $Q_1$ of the display particles Part. That is to say, the total charge quantity $Q_1$ of the display particles Part meets the following calculation formula: $Q_1 = (|Q_{11}| + |Q_{12}| + |Q_{13}|)/3$.

Optionally, in some exemplary embodiments of the present disclosure, the various charged particles further include charged colloidal particles Cell and polarization charges Polar. Obtaining the model parameter information further includes obtaining a total charge quantity $Q_2$ of the charged colloidal particles Cell and obtaining a total charge quantity $Q_3$ of the polarization charges Polar. Obtaining the total charge quantity $Q_2$ of the charged colloidal particles Cell may include: estimating a distribution quantity of positively charged colloidal particles Cell1 and a distribution quantity of negatively charged colloidal particles Cell2; calculating a total charge quantity $Q_{21}$ of the positively charged colloidal particles Cell1 according to the distribution quantity of the positively charged colloidal particles Cell1 and an electric charge of a single positively charged colloidal particle Cell1; calculating a total charge quantity $Q_{22}$ of the negatively charged colloidal particles Cell2 according to the distribution quantity of the negatively charged colloidal particles Cell2 and an electric charge of a single negatively charged colloidal particle Cell2; and calculating an average value of an absolute value of the total charge quantity $Q_{21}$ of the positively charged colloidal particles Cell1 and an absolute value of the total charge quantity $Q_{22}$ of the negatively charged colloidal particles Cell2 as the total charge quantity $Q_2$ of the charged colloidal particles Cell. That is to say, the total charge quantity $Q_2$ of the charged colloidal particles Cell meets the following calculation formula: $Q_2 = (|Q_{21}| + |Q_{22}|)/2$.

Obtaining the total charge quantity $Q_3$ of the polarization charges Polar includes: estimating a distribution quantity of positively charged polarization charges Polar1 and a distribution quantity of negatively charged polarization charges Polar2; calculating a total charge quantity $Q_{31}$ of the positively charged polarization charges Polar1 according to the distribution quantity of the positively charged polarization charges Polar1 and an electric charge of a single positively charged polarization charge Polar1; calculating a total charge quantity $Q_{32}$ of the negatively charged polarization charges Polar2 according to the distribution quantity of the negatively charged polarization charges Polar2 and an electric charge of a single negatively charged polarization charge Polar2; and calculating an average value of an absolute value of the total charge quantity $Q_{31}$ of the positively charged polarization charges Polar1 and an absolute value of the total charge quantity $Q_{32}$ of the negatively charged polarization charges Polar2 as the total charge quantity $Q_3$ of the polarization charges Polar. That is to say, the total charge quantity $Q_3$ of the polarization charges Polar meets the following calculation formula: $Q_3 = (|Q_{31}| + |Q_{32}|)/2$.

Optionally, in some exemplary embodiments of the present disclosure, obtaining the total charge quantity Q of the various charged particles in the electronic paper display device includes: determining a sum of the total charge quantity $Q_1$ of the display particles, the total charge quantity $Q_2$ of the charged colloidal particles and the total charge quantity $Q_3$ of the polarization charges as the total charge quantity Q of the various charged particles in the electronic paper display device. That is to say, the total charge quantity Q of the various charged particles meets the following calculation formula: $Q = Q_1 + Q_2 + Q_3$.

Figure 5:
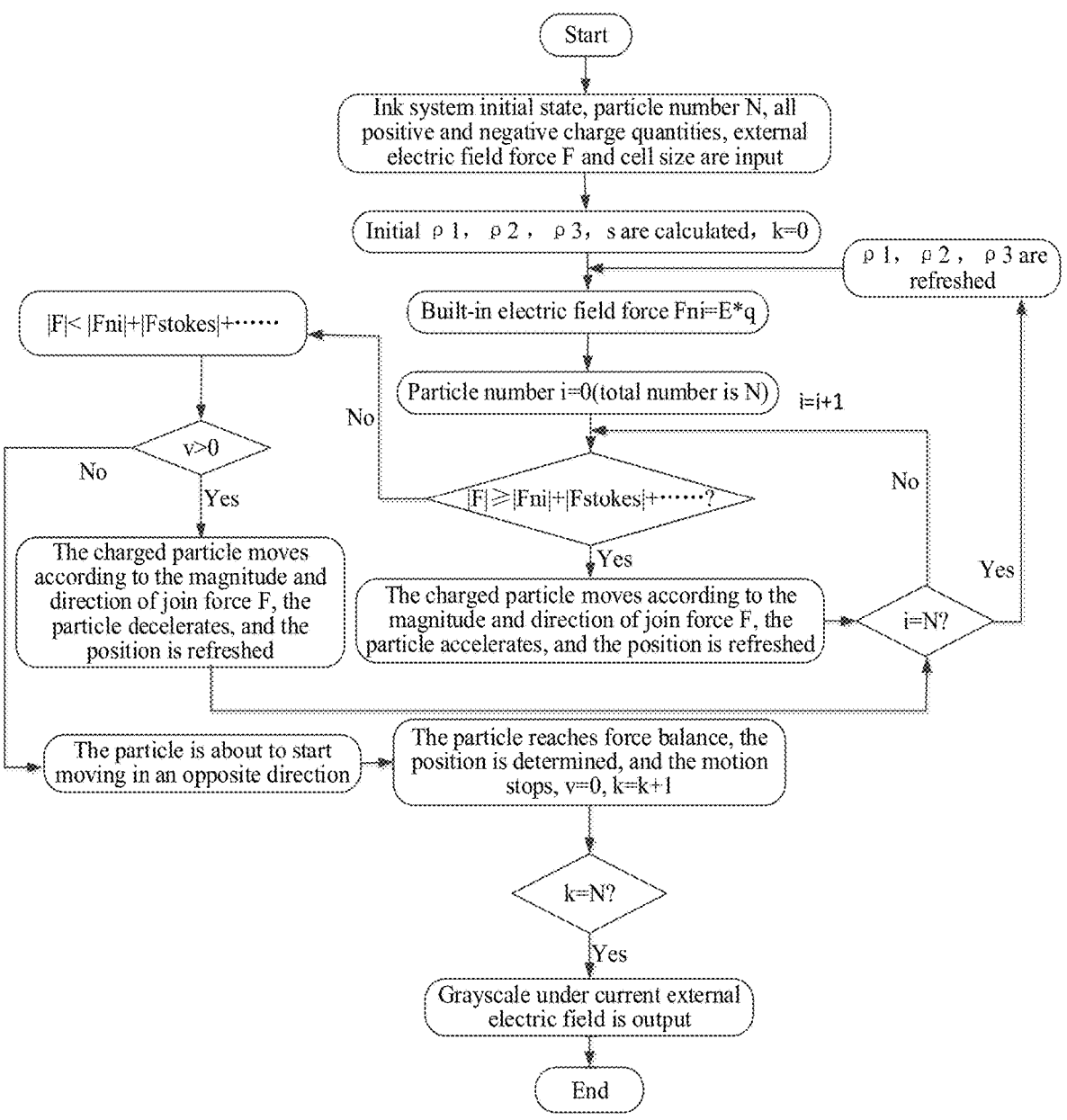
FIG. 5 shows a simulation method for an electronic paper display device according to some embodiments of the present disclosure, in which a process of charged particles from an initial motion to a final balance under the action of an external electric field is shown.

FIG. 5 shows a simulation method for an electronic paper display device according to some embodiments of the present disclosure, in which a process of charged particles from an initial motion to a final balance under the action of an external electric field is shown.

Optionally, in some exemplary embodiments of the present disclosure, the various charged particles include charged colloidal particles Cell, polarization charges Polar, and display particles Part used to adjust a display grayscale. Referring to FIG. 5, obtaining the model parameter information includes: obtaining the charge volume density $\rho_1$ of the display particles; obtaining the charge volume density $\rho_2$ of the charged colloidal particles; and obtaining the charge volume density $\rho_3$ of the polarization charges.

Optionally, in some exemplary embodiments of the present disclosure, obtaining the charge volume density $p_1$ of the display particles includes: estimating a distribution volume of the first-color particles Part1 and a distribution volume of the second-color particles Part2; obtaining the total charge quantity $Q_1$ of the display particles; and calculating the charge volume density $\rho_1$ of the display particles according to the distribution volume Vp1 of the first-color particles Part1, the distribution volume Vp2 of the second-color particles Part2, and the total charge quantity $Q_1$ of the display particles; and/or obtaining the charge volume density $\rho_2$ of the charged colloidal particles includes: estimating a distribution volume Vc of the charged colloidal particles; obtaining the total charge quantity $Q_2$ of the charged colloidal particles; and calculating the charge volume density $\rho_2$ of the charged colloidal particles according to the distribution volume Vc of the charged colloidal particles and the total charge quantity $Q_2$ of the charged colloidal particles; and/or obtaining the charge volume density $\rho_3$ of the polarization charges includes: estimating a distribution volume VpL of the polarization charges; obtaining the total charge quantity $Q_3$ of the polarization charges; and calculating the charge volume density $\rho_3$ of the polarization charges according to the distribution volume VpL of the polarization charges and the total charge quantity $Q_3$ of the polarization charges.

Optionally, in some exemplary embodiments of the present disclosure, obtaining the charge volume density of the display particles includes: estimating a distribution volume of the single-color particles; obtaining the total charge quantity of the display particles; and calculate the charge volume density of the display particles according to the distribution volume of the single-color particles and the total charge quantity of the display particles.

Optionally, in some exemplary embodiments of the present disclosure, obtaining the charge volume density of the display particles includes: estimating a distribution volume of the first-color particles, a distribution volume of the second-color particles, and a distribution volume of the third-color particles; obtaining the total charge quantity of the display particles; and calculating the charge volume density of the display particles according to the distribution volume of the first-color particles, the distribution volume of the second-color particles, the distribution volume of the third-color particles, and the total charge quantity of the display particles.

Optionally, in some exemplary embodiments of the present disclosure, the built-in electric field intensity E of the electronic paper display device is calculated according to the obtained model parameter information and the pre-constructed built-in electric field model. The built-in electric field model is:

$$E = m\frac{Q}{s} \,\&\&\, \rho_1\rho_2\rho_3,$$

where E represents the built-in electric field intensity, m is a predetermined constant, s represents a cross-sectional area of a single display pixel in the electronic paper display device, Q represents the total charge quantity of the various charged particles in the electronic paper display device, $\rho_1$ represents the charge volume density of the display particles, $\rho_2$ represents the charge volume density of the charged colloidal particles, $\rho_3$ represents the charge volume density of the polarization charges, and && is an operational symbol indicating a positive correlation between the built-in electric field intensity E and the charge volume densities $\rho_1$, $\rho_2$ and $\rho_3$ of the various charged particles.

It should be noted that the cross-section of the single display pixel may be a cross-section in a direction of the built-in electric field of a single display pixel in the electronic paper display device, that is, a cross-section parallel to the direction of the built-in electric field.

For example, the predetermined constant m may be related to factors such as electrostatic force constant, adjustable coefficient, dielectric constant, etc. For example, m may be calculated by the following equation:

$$m = \frac{4\pi kh}{\xi},$$

where k is an electrostatic force constant, h is an adjustable coefficient, and $\xi$ is a dielectric constant.

Optionally, in some exemplary embodiments of the present disclosure, various charged particles in the electronic paper display device may include display particles Part, charged colloidal particles Cell, and polarization charges Polar. A model parameter information at time t of the electronic paper display device may be obtained. The built-in electric field intensity E of the electronic paper display device may be calculated based on the obtained model parameter information and the pre-constructed built-in electric field model. The built-in electric field model is:

$$E = m\frac{Q_1(t)}{s} * f_1(t) + m\frac{Q_2(t)}{s} * f_2(t) + m\frac{Q_3(t)}{s} * f_3(t),$$

where E represents the built-in electric field intensity, m is a predetermined constant, s represents a cross-sectional area of a single display pixel in the electronic paper display device, $Q_1(t)$ represents the total charge quantity of the display particles at time t, $f_1(t)$ represents the charge volume density of the display particles at time t, $Q_2(t)$ represents the total charge quantity of the charged colloidal particles at time t, $f_2(t)$ represents the charge volume density of the charged colloidal particles at time t, $Q_3(t)$ represents the total charge quantity of the polarization charges at time t, and $f_3(t)$ represents the charge volume density of the polarization charges at time t.

Exemplarily, the charge volume density $f_1(t)$ of the display particles at time t is calculated by:

$$f_1(t) = \frac{Q_1(t)}{(V_{P1}(t) + V_{P2}(t))^{z1}},$$

where $V_{P1}(t)$ represents the distribution volume of the first-color particles at time t, $V_{P2}(t)$ represents the distribution volume of the second-color particles at time t, and z1 is a first volume correction coefficient; and/or the charge volume density $f_2(t)$ of the charged colloidal particles at time t is calculated by:

$$f_2(t) = \frac{Q_2(t)}{(V_{C1}(t) + V_{C2}(t))^{z2}},$$

where $V_{C1}(t)$ represents a distribution volume of positively charged colloidal particles at time t, $V_{C2}(t)$ represents a distribution volume of negatively charged colloidal particles at time t, and z2 is a second volume correction coefficient; and/or the charge volume density $f_3(t)$ of the polarization charges at time t is calculated by:

$$f_3(t) = \frac{Q_3(t)}{(V_{PL1}(t) + V_{PL2}(t))^{z3}},$$

where $V_{PL1}(t)$ represents a distribution volume of positive polarization charges at time t, $V_{PL2}(t)$ represents a distribution volume of negative polarization charges at time t, and z3 is a third volume correction coefficient.

Referring to FIG. 3A and FIG. 5, the built-in electric field force acting on each charged particle in the electronic paper display device is calculated based on the built-in electric field intensity. For example, if a charge quantity of a charged particle a is q and the built-in electric field intensity is E, then the built-in electric field force acting on the charged particle a is Fni=E*q. When moving in the electronic paper display device, the charged particle is not only subjected to the external electric field force F, but also to the built-in electric field force Fni and Stokes resistance Fst. The Stokes resistance Fst meets the following calculation formula: Fst=4πηVR, where η is a viscosity coefficient of the liquid, v represents a velocity of the charged particle relative to the liquid, and R represents a radius of the charged particle.

A force analysis may be performed on the charged particle a. For example, the charged particle a is subjected to an upward external electric field force F, a downward built-in electric field force Fni, and a downward Stokes resistance Fst.

It should be noted that in addition to the external electric field force F, the built-in electric field force Fni and the Stokes resistance Fst, the particle may be further subjected to other forces such as gravity and buoyancy. The force model of the present disclosure only schematically illustrates the main forces acting on particles, but the force model for particles is not limited to this and may also include other force models, such as those involving gravity and buoyancy. It should be understood that the above is just an exemplary embodiment of the present disclosure, rather than a limitation to the present disclosure.

By analyzing the external electric field force F as well as the built-in electric field force Fni and Stokes resistance Fst acting on each charged particle in the electronic paper display device, it is possible to simulate a motion of each charged particle in the electronic paper display device.

For example, in some embodiments of the present disclosure, referring to FIG. 5, a motion of the charged particle in the electronic paper display device is simulated. The motion simulation step specifically includes: for an $i^{th}$ particle, simulating an accelerated motion of the $i^{th}$ particle and refreshing a position of the $i^{th}$ particle in response to an absolute value of an external electric field force acting on the $i^{th}$ particle being greater than or equal to a sum of an absolute value of a built-in electric field force acting on the $i^{th}$ particle and an absolute value of a resistance acting on the $i^{th}$ particle.

For example, continuing to refer to FIG. 5, the motion simulation step further specifically includes: for the $i^{th}$ particle, simulating a decelerated motion of the $i^{th}$ particle and refreshing a position of the $i^{th}$ particle in response to the absolute value of the external electric field force acting on the $i^{th}$ particle being less than the sum of the absolute value of the built-in electric field force acting on the $i^{th}$ particle and the absolute value of the resistance acting on the $i^{th}$ particle.

For example, the method further includes: determining a relationship between i and a total number N of particles in the electronic paper display device after simulating the accelerated motion or the decelerated motion of the $i^{th}$ particle; and assigning a value of i+1 to i and repeatedly performing the motion simulation step in response to i not being equal to N.

For example, continuing to refer to FIG. 5, the method further includes: recalculating the respective charge volume densities of the various charged particles in response to i being equal to N; and repeatedly performing the built-in electric field intensity calculation step, the built-in electric field force calculation step and the motion simulation step based on the recalculated charge volume densities.

According to some exemplary embodiments, continuing to refer to FIG. 5, the method further includes: for the $i^{th}$ particle, determining a direction of motion of the $i^{th}$ particle in response to the absolute value of the external electric field force acting on the $i^{th}$ particle being less than the sum of the absolute value of the built-in electric field force acting on the $i^{th}$ particle and the absolute value of the resistance acting on the $i^{th}$ particle; and determining that the motion of the $i^{th}$ particle stops, in response to a determination of the direction of motion being reverse. In response to the motion of the $i^{th}$ particle stopping, a value of k+1 is assigned to k, where k is the number of particles reaching a stop state. Before the motion simulation starts, the value of k is 0, and then the motion simulation step is repeatedly performed.

For example, continuing to refer to FIG. 5, the method further includes: in response to k being equal to N, determining that the electronic paper display device has reached a steady state, ending the cycle, and outputting the relationship between the external electric field force F and the corresponding grayscale in the current state.

By using the above-mentioned simulation method for the electronic paper display device, it is possible to quickly calculate the corresponding relationship between display grayscale and external electric field force in electronic paper display devices with different parameters by using a calculation program, which may assist developers in designing and optimizing parameters, and may greatly improve research and development efficiency and save costs.

Figure 6A:
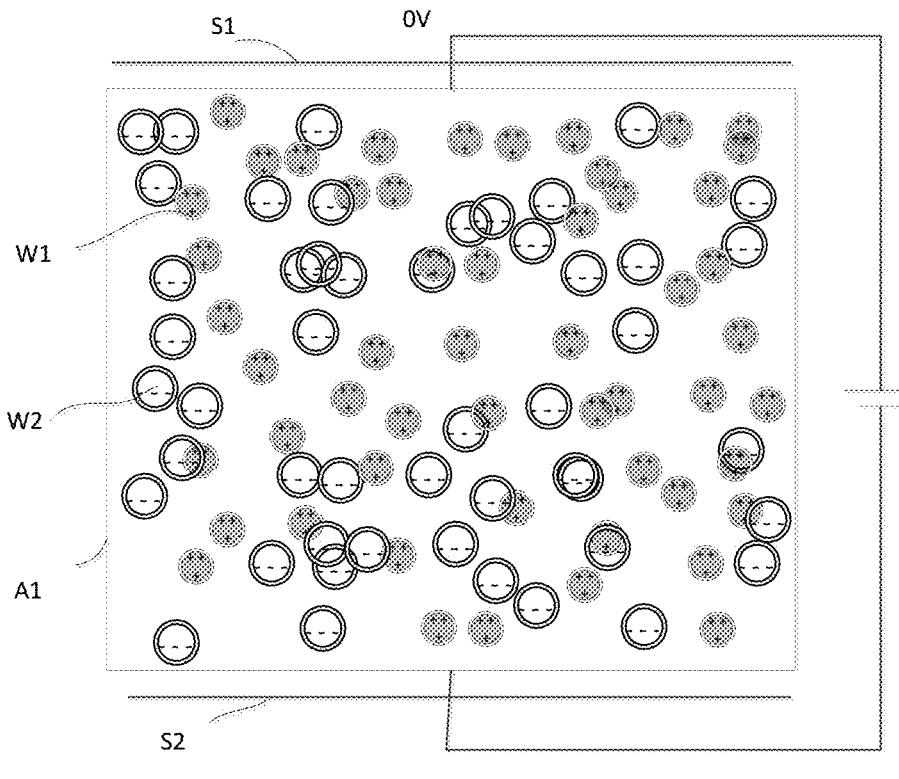
FIG. 6A to FIG. 6F show schematic diagrams of states of various charged particles in a display element of the electronic paper display device under different conditions, where
Figure 6B:
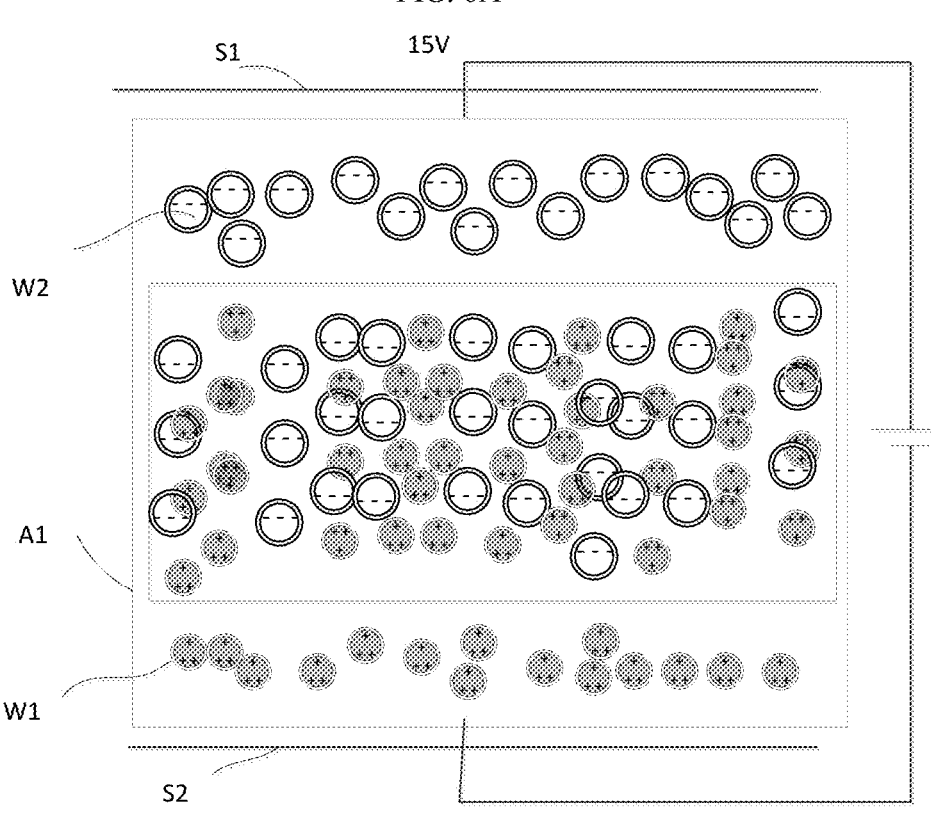
Figure 6C:
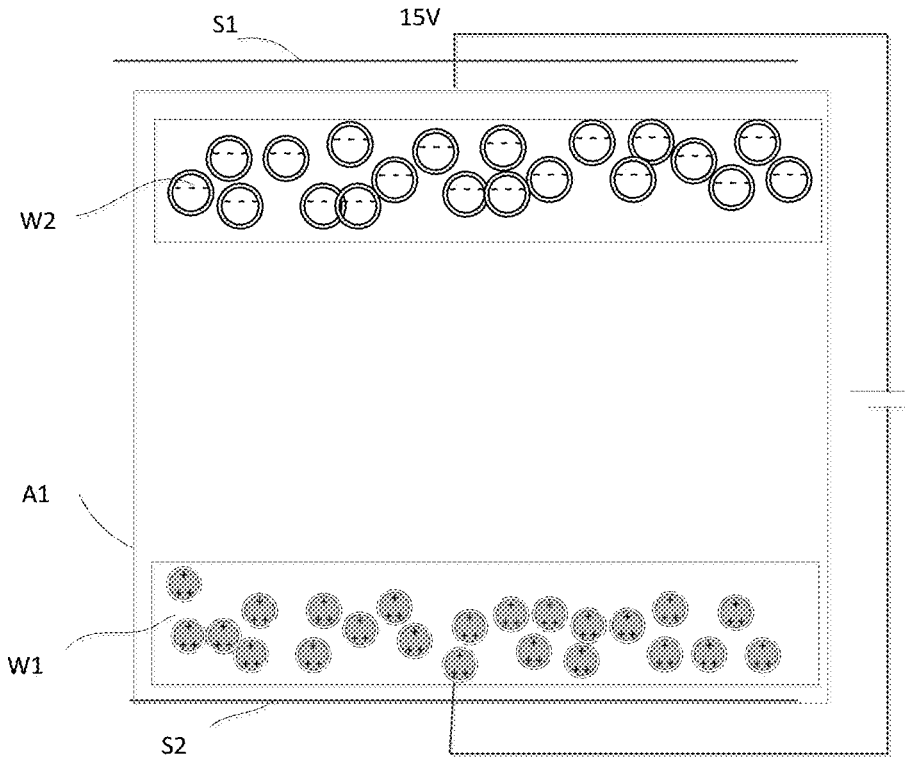
Figure 6D:
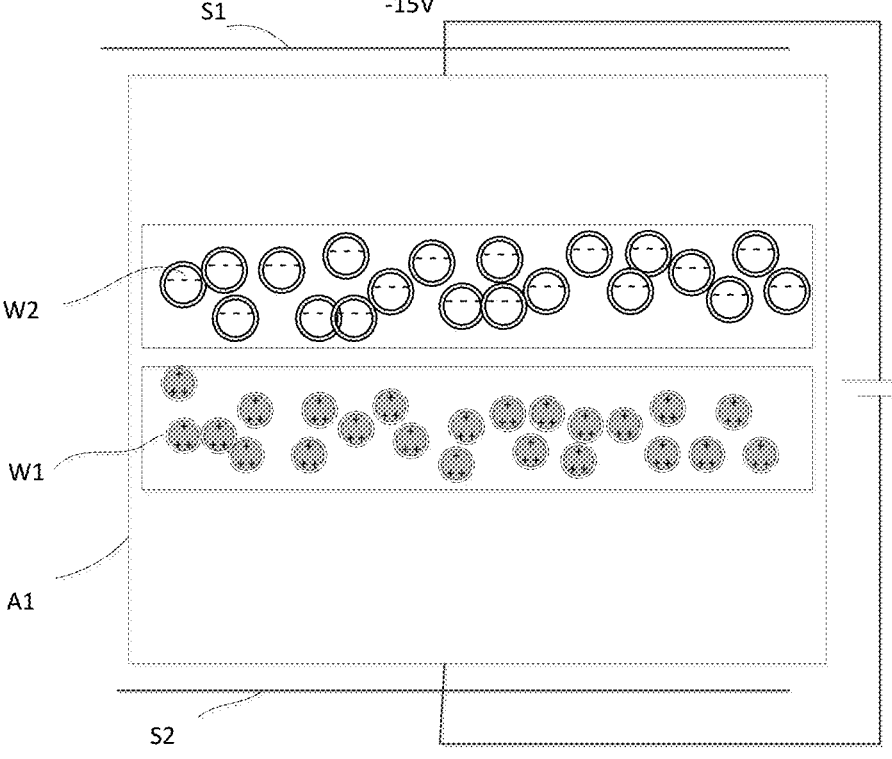
Figures 6E, 6F:
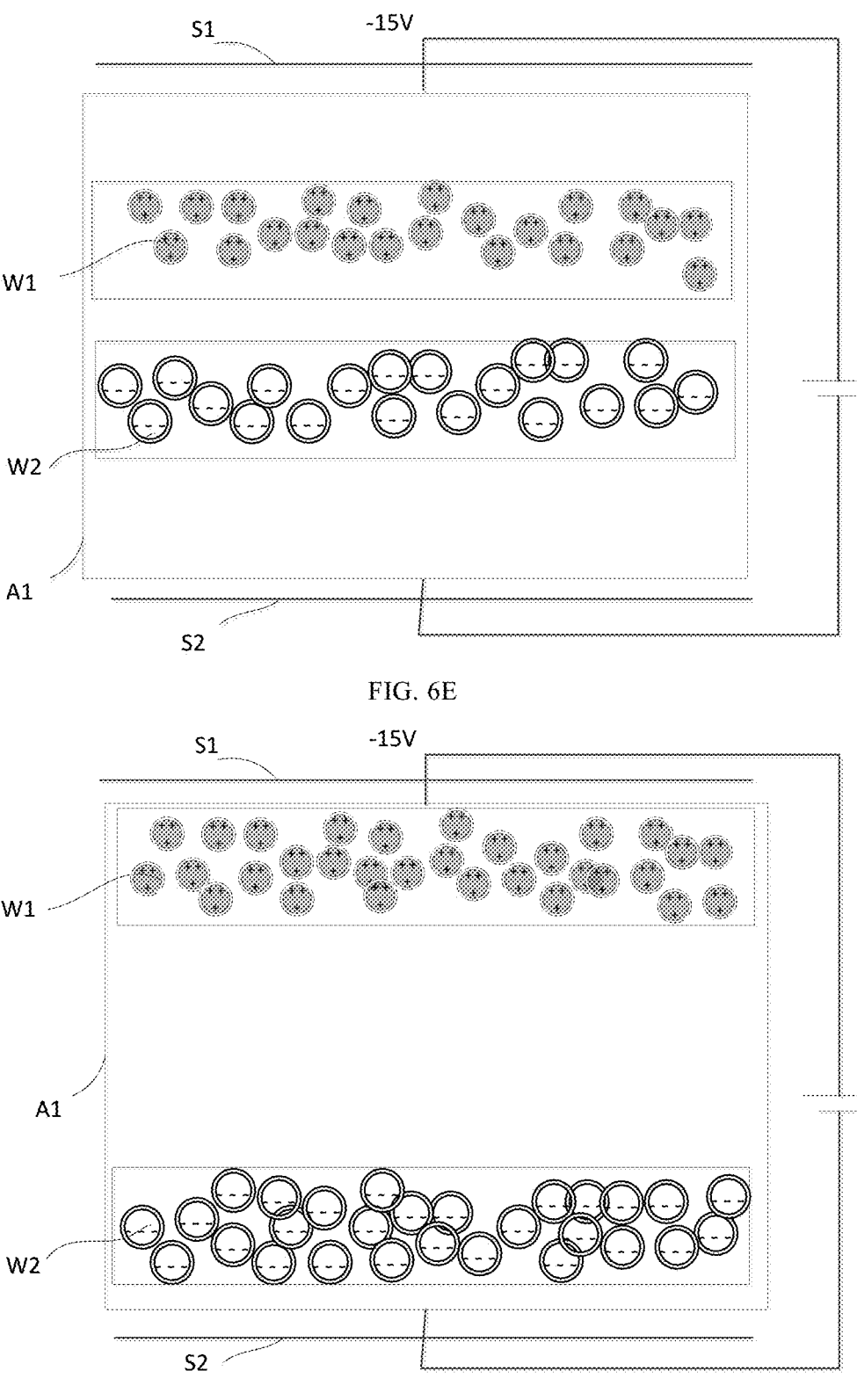
Figure 7A:
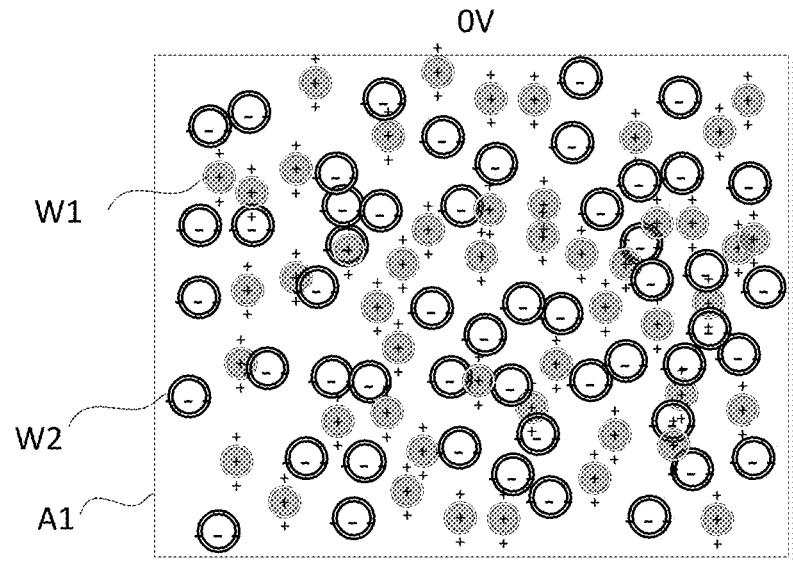
FIG. 7A to FIG. 7I show schematic diagrams of a relationship between a grayscale of a display element and an external electric field in the electronic paper display device according to embodiments of the present disclosure.
Figure 7B:
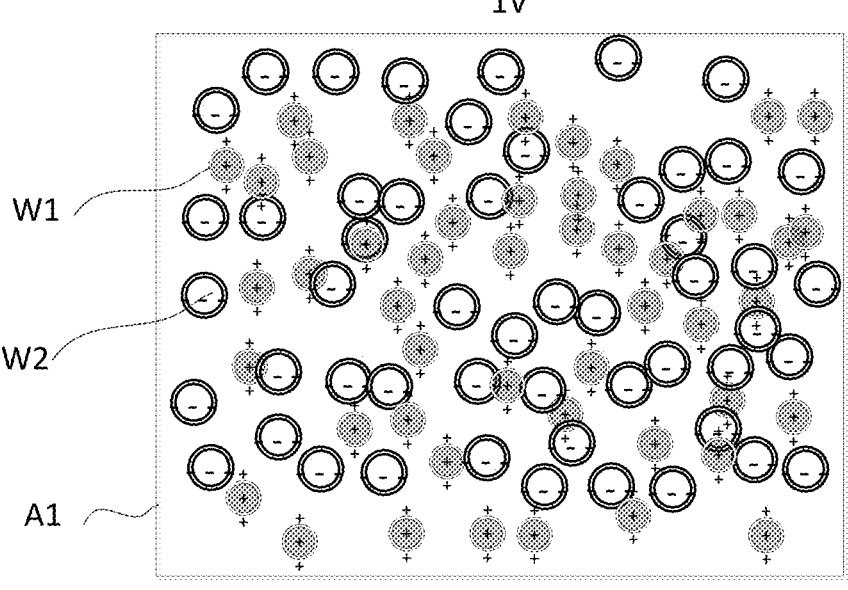
Figure 7C:
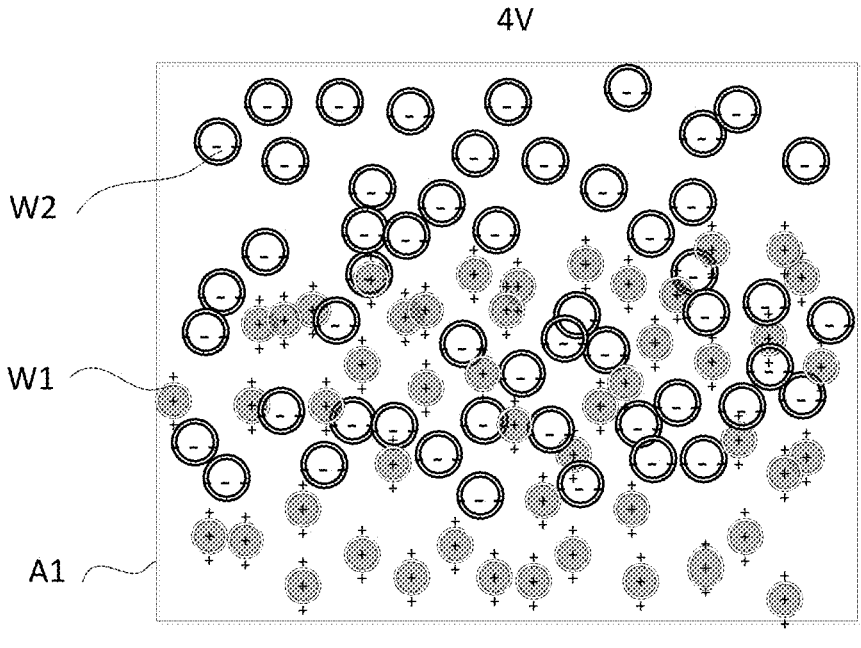
Figure 7D:
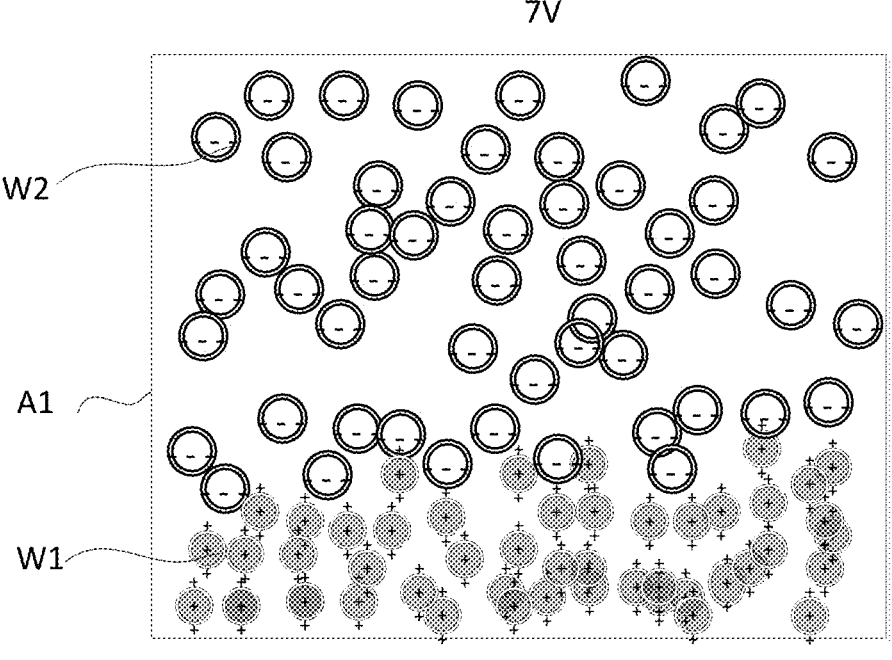
Figure 7E:
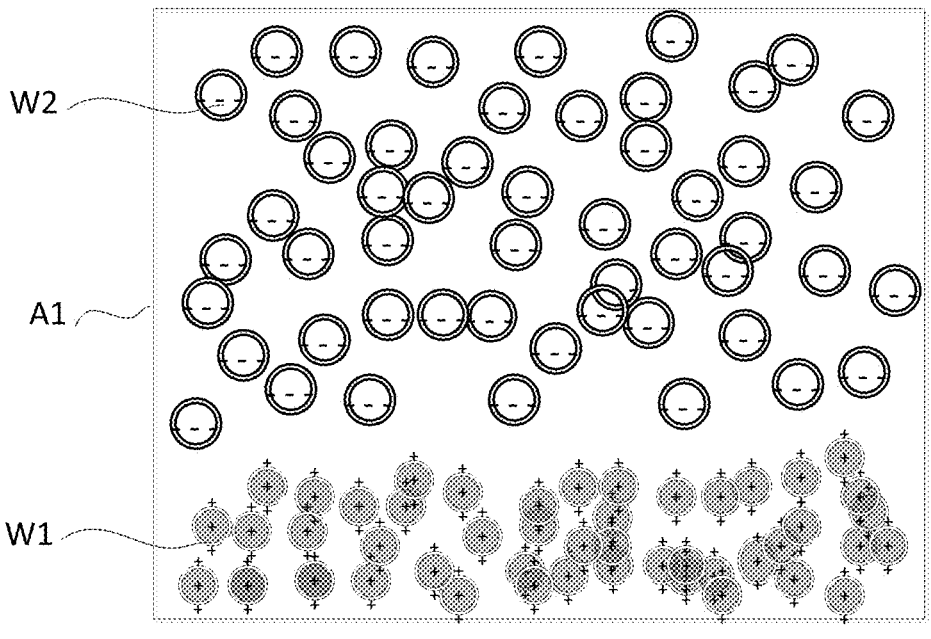
Figure 7F:
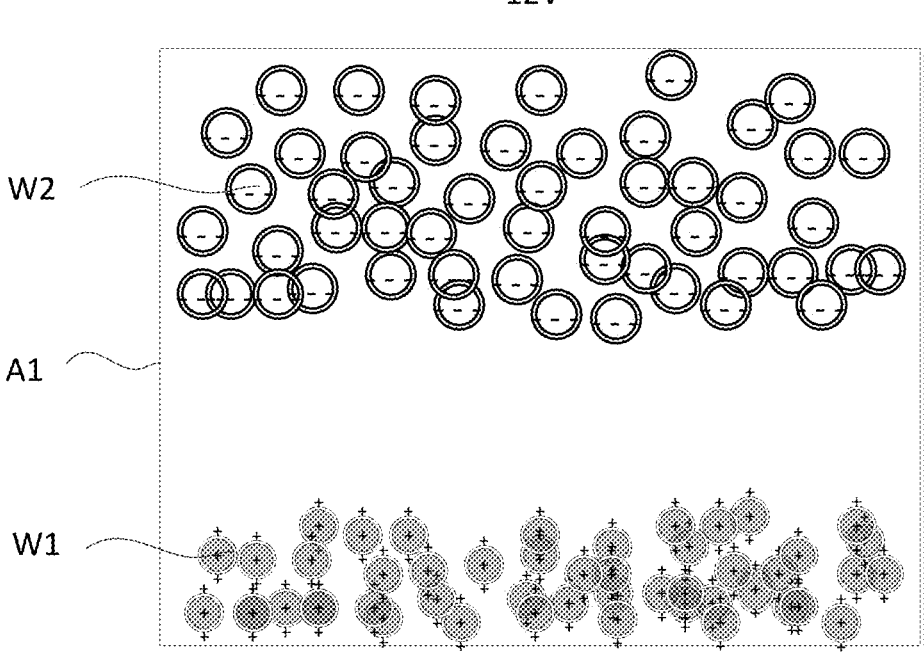
Figure 7G:
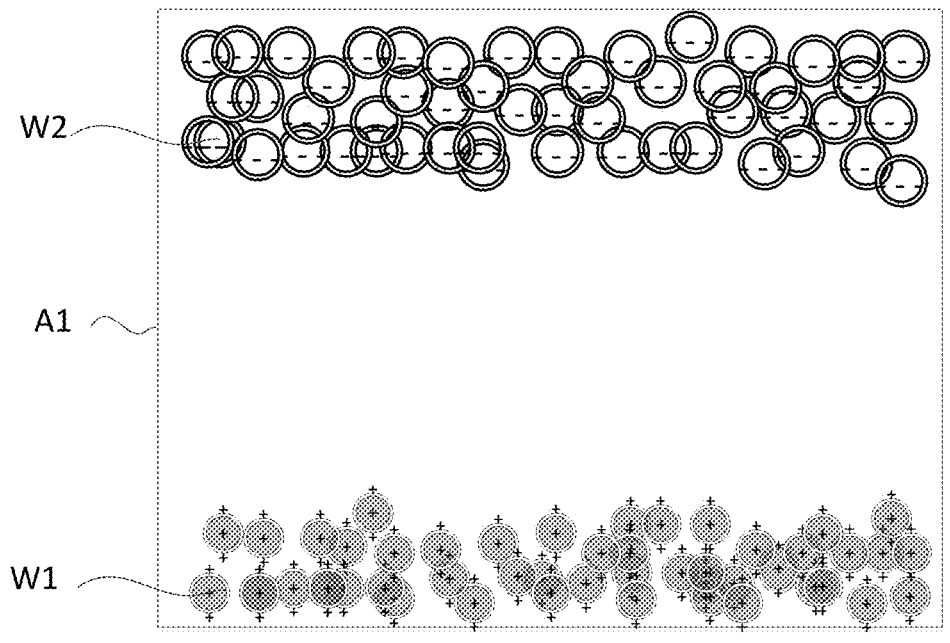
Figure 7H:
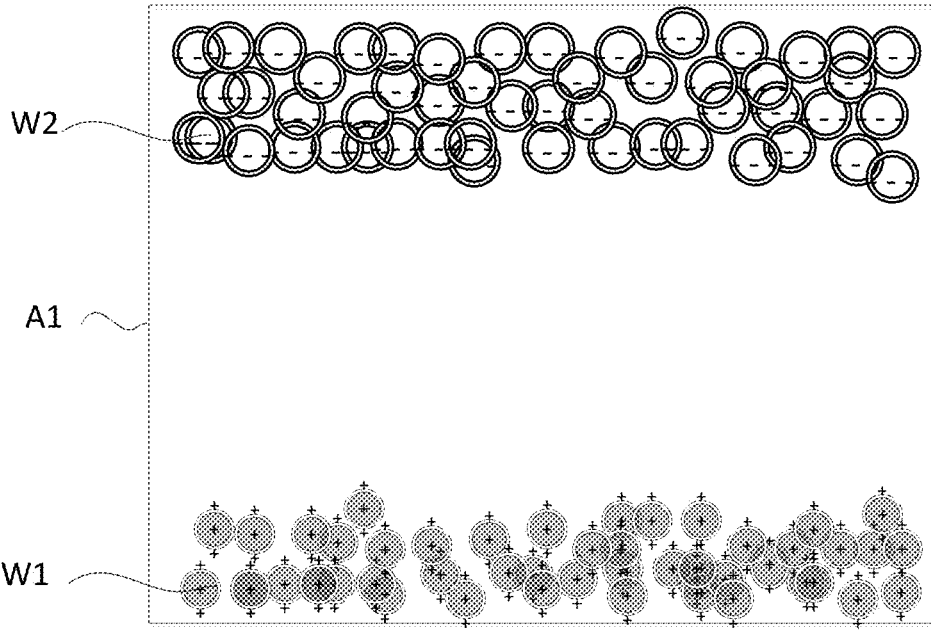
Figure 7I:
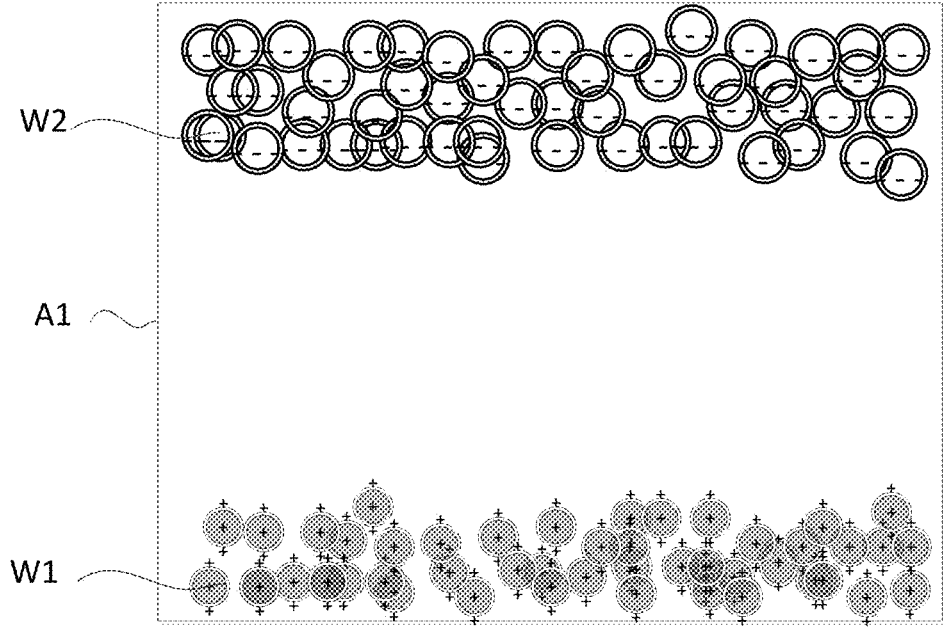

FIG. 6A to FIG. 6F show schematic diagrams of states of various charged particles in a display element of the electronic paper display device under different external electric field conditions, where FIG. 6A shows an initial state of various charged particles, FIG. 6B shows a state of various charged particles in an early stage of applying a positive voltage, FIG. 6C shows a state in which various charged particles reach a steady state under the applied positive voltage, FIG. 6D shows an early state of various charged particles after voltage switching, FIG. 6E shows a mid-term state of various charged particles after voltage switching, and FIG. 6F shows a steady state of various charged particles after voltage switching.

Optionally, in some exemplary embodiments of the present disclosure, with reference to FIG. 6A to FIG. 6F, the simulation method for the electronic paper display device may be used to simulate and calculate the motion states of various charged particles in the display element of the electronic paper display device when different external electric fields are applied.

For example, the various charged particles in the electronic paper display device may include display particles for display and other charged particles, such as charged colloidal particles and polarization charges. The display particles may include positively charged black particles W1 and negatively charged white particles W2. In order to clearly and concisely describe the relationship between external electric field and display state, only the black particles W1 and the white particles W2 are schematically shown in FIG. 6A to FIG. 6F, but the embodiments of the present disclosure are not limited thereto.

Referring to FIG. 6A, before an external electric field is applied, various charged particles are randomly distributed in the display element of the electronic paper display device. Referring to FIG. 6B, when a positive voltage is applied to the thin film electrode S1 on the side away from the base substrate and close to the light emitting side, the negatively charged white particles W2 may move towards the side of the electrode S1, while the positively charged black particles W1 may move towards the side of the electrode S2. In the early stage of applying the positive voltage, as the motion of the various charged particles is not yet sufficient, most of a middle region of the display element A1 still maintains a chaotic mixture of black particles W1 and white particles W2. Referring to FIG. 6C, after the positive voltage has been applied for a period of time, the motion of black particles W1 and white particles W2 towards the electrodes on both sides may gradually stabilize. At this time, a large number of white particles may gather near the electrode S1, and a large number of black particles may gather near the electrode S2. As the electrode S1 is located on the light emitting side, the display element may display white. Referring to FIG. 6D, when a negative voltage is applied to the thin film electrode S1 on the side away from the base substrate and close to the light emitting side, the steady states of the black particles W1 and the white particles W2 are broken. Under the action of the external electric field force, the white particles W2 move towards the side of the electrode S2 and the black particles move towards the side of the electrode S1. Referring to FIG. 6E, with the motion of the black particles W1 and the white particles W2, the black particles W1 may be closer to the electrode S1, and the white particles W2 may be farther away from the electrode S1. Referring to FIG. 6F, when the black particles W1 and the white particles W2 reach a steady state, a large number of black particles gather near the electrode S1, and a large number of white particles gather near the electrode S2. As the electrode S1 is located on the light emitting side, the display element displays black at this time.

By using the above-mentioned simulation method for the electronic paper display device, it is possible to quickly calculate the corresponding relationship between display grayscale and external electric field force in electronic paper display devices with different parameters by using a calculation program, which may assist developers in designing and optimizing parameters, and may greatly improve research and development efficiency and save costs.

FIG. 7A to FIG. 7I show schematic diagrams of a relationship between a grayscale of a display element and an external electric field in an electronic paper display device according to embodiments of the present disclosure.

For example, in some embodiments of the present disclosure, the simulation method for the electronic paper display device may further simulate and calculate the display grayscale in the display element under different external voltages, thereby establishing a relationship diagram between external electric field force and display grayscale. With reference to FIG. 7A to FIG. 7I, by setting various model information parameters in the simulation model for the electronic paper display device and then gradually adjusting the size of the external electric field, a concentration of white particles close to the light emitting side may gradually increase with a gradual increase in the external electric field, and the display element shows different grayscales. When the external electric field increases to a certain value, such as 15V, a change in the grayscale of the display element may be not significant. By simulating and calculating the grayscale of the display element under different external electric fields, it is more convenient to perform an optimization design on the parameters of the electronic paper display device, and the research and development efficiency may be improved.

Figure 8:
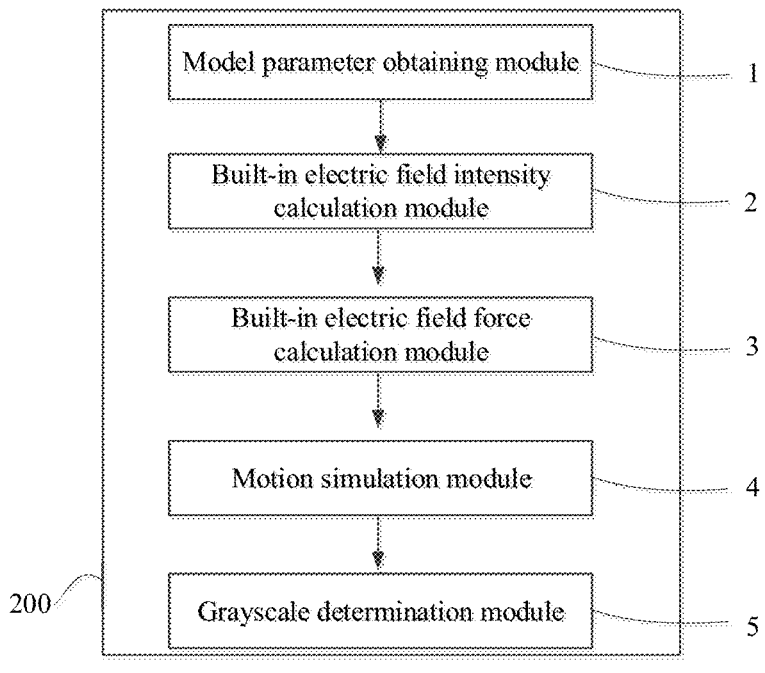
FIG. 8 shows a schematic block diagram of a simulation device for an electronic paper display device according to some embodiments of the present disclosure.

FIG. 8 shows a schematic block diagram of a simulation device for an electronic paper display device according to some embodiments of the present disclosure.

Optionally, the embodiments of the present disclosure further provide a simulation device 200 for an electronic paper display device. Referring to FIG. 8, the device 200 includes: a model parameter obtaining module 1 used to obtain a model parameter information, where the model parameter information includes a total charge quantity of various charged particles in the electronic paper display device, respective charge volume densities of the various charged particles, and an external electric field force; a built-in electric field intensity calculation module 2 used to calculate a built-in electric field intensity of the electronic paper display device by using the model parameter information and a pre-constructed built-in electric field model, where an input of the built-in electric field model includes the total charge quantity of the various charged particles in the electronic paper display device and the respective charge volume densities of the various charged particles, and an output of the built-in electric field model includes the built-in electric field intensity; a built-in electric field force calculation module 3 used to calculate, based on the built-in electric field intensity, a built-in electric field force acting on each charged particle in the electronic paper display device; a motion simulation module 4 used to simulate a motion of each charged particle in the electronic paper display device according to the external electric field force and the built-in electric field force acting on each charged particle in the electronic paper display device; and a grayscale determination module 5 used to determine a display grayscale under the external electric field force to obtain a simulation relationship between display grayscale and external electric field force, in response to the motion of each charged particle in the electronic paper display device stopping.

By using the above-mentioned simulation method for the electronic paper display device, it is possible to quickly calculate the corresponding relationship between the display grayscale and the external electric field force in electronic paper display devices with different parameters by using a calculation program, which may assist developers in designing and optimizing parameters, and may greatly improve research and development efficiency and save costs.

According to embodiments of the present disclosure, any number of the model parameter obtaining module 1, the built-in electric field intensity calculation module 2, the built-in electric field force calculation module 3, the motion simulation module 4 and the grayscale determination module 5 may be combined into one module for implementation, or any one of the modules may be divided into a plurality of modules. Alternatively, at least part of the functions of one or more of these modules may be combined with at least part of the functions of other modules and implemented in one module. According to embodiments of the present disclosure, at least one of the model parameter obtaining module 1, the built-in electric field intensity calculation module 2, the built-in electric field force calculation module 3, the motion simulation module 4 and the grayscale determination module 5 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other rational manner of integrating or encapsulating the circuit, or may be implemented by any one of the three implementation modes of software, hardware and firmware or an appropriate combination thereof. Alternatively, at least one of the model parameter obtaining module 1, the built-in electric field intensity calculation module 2, the built-in electric field force calculation module 3, the motion simulation module 4 and the grayscale determination module 5 may be at least partially implemented as a computer program module that may perform corresponding functions when executed.

Figure 9:
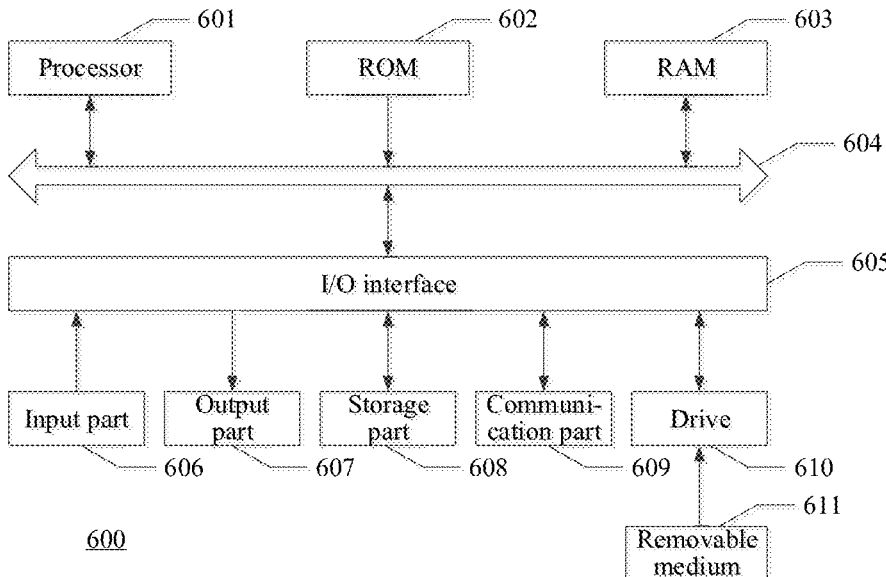
FIG. 9 shows a schematic block diagram of an electronic apparatus according to some embodiments of the present disclosure.

FIG. 9 shows a schematic block diagram of an electronic apparatus according to some embodiments of the present disclosure.

Optionally, the embodiments of the present disclosure further provide an electronic apparatus 600. Referring to FIG. 9, the electronic apparatus 600 includes a processor 601, which may execute various appropriate actions and processing according to the program stored in a read only memory (ROM) 602 or the program loaded into a random access memory (RAM) 603 from a storage part 608. The processor 601 may include, for example, a general-purpose microprocessor (for example, CPU), an instruction set processor and/or a related chipset and/or a special-purpose microprocessor (for example, an application specific integrated circuit (ASIC)), and the like. The processor 601 may further include an on-board memory for caching purposes. The processor 601 may include a single processing unit or a plurality of processing units for executing different actions of the method flow according to embodiments of the present disclosure.

Various programs and data required for the operation of the electronic apparatus 600 are stored in the RAM 603. The processor 601, the ROM 602 and the RAM 603 are connected to each other through a bus 604. The processor 601 executes various operations of the method flow according to embodiments of the present disclosure by executing the programs in the ROM 602 and/or the RAM 603. It should be noted that the program may also be stored in one or more memories other than the ROM 602 and the RAM 603. The processor 601 may also execute various operations of the method flow according to embodiments of the present disclosure by executing the programs stored in the one or more memories.

The electronic apparatus 600 may further include an input/output (I/O) interface 605 which is also connected to the bus 604. The electronic apparatus 600 may further include one or more of the following components connected to the I/O interface 605: an input part 606 including a keyboard, a mouse, etc.; an output part 607 including a cathode ray tube (CRT), a liquid crystal display (LCD), etc. and a speaker, etc.; a storage part 608 including a hard disk, etc.; and a communication part 609 including a network interface card such as a LAN card, a modem, and the like. The communication part 609 performs communication processing via a network such as the Internet. A drive 610 is also connected to the I/O interface 605 as needed. A removable medium 611, such as a magnetic disk, an optical disk, a magneto-optical disk, a semiconductor memory, and the like, is installed on the drive 610 as needed, so that the computer program read therefrom is installed into the storage part 608 as needed.

By using the electronic apparatus described above, a program of any simulation method described above may be executed to quickly calculate the corresponding relationship between display grayscale and external electric field force in electronic paper display devices with different parameters, which may assist developers in designing and optimizing parameters, and may greatly improve research and development efficiency and save costs.

Optionally, embodiments of the present disclosure further provide an electronic paper display device, where a relationship between display grayscale and external electric field force of the electronic paper display device is determined based on the method in any of the aforementioned embodiments.

The electronic paper display device includes: a base substrate; a first electrode provided on the base substrate; a second electrode provided on a side of the first electrode away from the base substrate; and charged particles provided between the first electrode and the second electrode. The charged particles are configured to be driven to a display side under an action of an external electric field applied between the first electrode and the second electrode, so as to achieve a display grayscale meeting the relationship between display grayscale and external electric field force.

Figure 10:
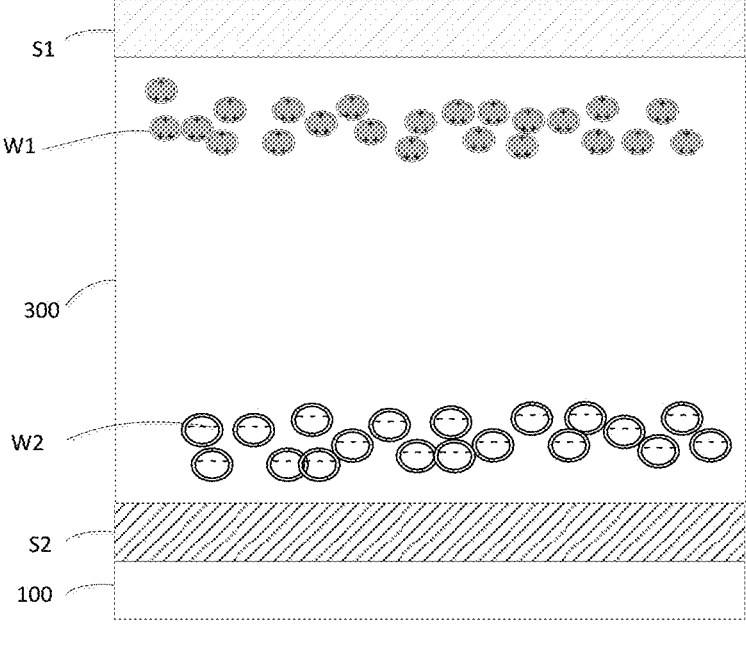
FIG. 10 shows a schematic cross-sectional view of a display panel included in the electronic paper display device according to some exemplary embodiments of the present disclosure.

FIG. 10 shows a schematic cross-sectional view of a display panel included in the electronic paper display device according to some exemplary embodiments of the present disclosure For example, the electronic paper display device includes a display panel. Referring to FIG. 10, the display panel includes: a base substrate 100; an electrode S2 (i.e., a first electrode) located on the base substrate 100; a display adjustment portion 300 located on a side of the electrode S2 away from the base substrate 100; and an electrode S1 (i.e., a second electrode) located on a side of the display adjustment portion 300 away from the base substrate 100. The display adjustment portion 300 may contain a large number of display particles used to adjust the display effect, such as charged black particles W1 and charged white particles W2. The display adjustment portion 300 is located between the electrode S1 and the electrode S2. When the electrode S1 and the electrode S2 are turned on, the display particles in the display adjustment portion 300 may respectively move in a direction close to the base substrate or a direction away from the base substrate under the action of an external electric field. The electrode S1 may be a transparent or semi-transparent electrode. When the display particles moving in the direction away from the base substrate move to a region near the electrode S1, the color of the display particles may appear in the corresponding region. That is, the charged particles are driven to the display side under the action of the external electric field applied between the first electrode S2 and the second electrode S1, so as to achieve a display grayscale that meets the relationship between display grayscale and external electric field force.

Although some embodiments of the general technical concept of the present disclosure have been illustrated and explained, those ordinary skilled in the art may understand that changes may be made to those embodiments without departing from a principle and spirit of the general technical concept. The scope of the present disclosure is defined by the claims and their equivalents.

What is claimed is:

1. A simulation method for an electronic paper display device, comprising:

a model parameter obtaining step of obtaining a model parameter information, wherein the model parameter information comprises a total charge quantity of various charged particles in the electronic paper display device, respective charge volume densities of the various charged particles, and an external electric field force;

a built-in electric field intensity calculation step of calculating a built-in electric field intensity of the electronic paper display device by using the model parameter information and a pre-constructed built-in electric field model, wherein an input of the built-in electric field model comprises the total charge quantity of the various charged particles in the electronic paper display device and the respective charge volume densities of the various charged particles, and an output of the built-in electric field model comprises the built-in electric field intensity;

a built-in electric field force calculation step of calculating, based on the built-in electric field intensity, a built-in electric field force acting on each charged particle in the electronic paper display device;

a motion simulation step of simulating a motion of each charged particle in the electronic paper display device according to the external electric field force and the built-in electric field force acting on each charged particle in the electronic paper display device; and a grayscale determination step of determining a display grayscale under the external electric field force to obtain a simulation relationship between display grayscale and external electric field force, in response to the motion of each charged particle in the electronic paper display device stopping.

2. The method according to claim 1, wherein in the built-in electric field model, the built-in electric field intensity is positively correlated with the total charge quantity of the various charged particles in the electronic paper display device; and/or wherein in the built-in electric field model, the built-in electric field intensity is positively correlated with the respective charge volume densities of the various charged particles.

3. The method according to claim 1, wherein the various charged particles comprise display particles configured to adjust the display grayscale; and wherein the obtaining a model parameter information comprises obtaining a total charge quantity of the display particles.

4. The method according to claim 3, wherein the display particles comprise first-color particles and second-color particles;

the obtaining a total charge quantity of the display particles comprises:

estimating a distribution quantity of the first-color particles and a distribution quantity of the second-color particles;

calculating a total charge quantity of the first-color particles according to the distribution quantity of the first-color particles and an electric charge of a single first-color particle;

calculating a total charge quantity of the second-color particles according to the distribution quantity of the second-color particles and an electric charge of a single second-color particle; and calculating an average value of an absolute value of the total charge quantity of the first-color particles and an absolute value of the total charge quantity of the second-color particles as the total charge quantity of the display particles.

5. The method according to claim 3, wherein the display particles comprise single-color particles; and wherein the obtaining a total charge quantity of the display particles comprises:

estimating a distribution quantity of the single-color particles; and calculating a total charge quantity of the single-color particles according to the distribution quantity of the single-color particles and an electric charge of a single single-color particle.

6. The method according to claim 3, wherein the display particles comprise first-color particles, second-color particles, and third-color particles; and wherein the obtaining a total charge quantity of the display particles comprises:

estimating a distribution quantity of the first-color particles, a distribution quantity of the second-color particles, and a distribution quantity of the third-color particles;

calculating a total charge quantity of the first-color particles according to the distribution quantity of the first-color particles and an electric charge of a single first-color particle;

calculating a total charge quantity of the second-color particles according to the distribution quantity of the second-color particles and an electric charge of a single second-color particle;

calculating a total charge quantity of the third-color particles according to the distribution quantity of the third-color particles and an electric charge of a single third-color particle; and calculating an average value of an absolute value of the total charge quantity of the first-color particles, an absolute value of the total charge quantity of the second-color particles and an absolute value of the total charge quantity of the third-color particles as the total charge quantity of the display particles.

7. The method according to claim 3, wherein the various charged particles further comprise charged colloidal particles and polarization charges; and wherein the obtaining a model parameter information further comprises: obtaining a total charge quantity of the charged colloidal particles; and obtaining a total charge quantity of the polarization charges.

8. The method according to claim 7, wherein obtaining a total charge quantity of various charged particles in the electronic paper display device comprises: determining a sum of the total charge quantity of the display particles, the total charge quantity of the charged colloidal particles and the total charge quantity of the polarization charges as the total charge quantity of the various charged particles in the electronic paper display device.

9. The method according to claim 1, wherein the various charged particles comprise charged colloidal particles, polarization charges, and display particles configured to adjust the display grayscale; and wherein the obtaining a model parameter information comprises: obtaining a charge volume density of the display particles; obtaining a charge volume density of the charged colloidal particles; and obtaining a charge volume density of the polarization charges.

10. The method according to claim 9, wherein the obtaining a charge volume density of the display particles comprises:

estimating a distribution volume of first-color particles and a distribution volume of second-color particles;

obtaining a total charge quantity of the display particles; and calculating the charge volume density of the display particles according to the distribution volume of the first-color particles, the distribution volume of the second-color particles, and the total charge quantity of the display particles; and/or wherein the obtaining a charge volume density of the charged colloidal particles comprises:

estimating a distribution volume of the charged colloidal particles;

obtaining a total charge quantity of the charged colloidal particles; and calculating the charge volume density of the charged colloidal particles according to the distribution volume of the charged colloidal particles and the total charge quantity of the charged colloidal particles; and/or wherein the obtaining a charge volume density of the polarization charges comprises:

estimating a distribution volume of the polarization charges;

obtaining a total charge quantity of the polarization charges; and calculating the charge volume density of the polarization charges according to the distribution volume of the polarization charges and the total charge quantity of the polarization charges.

11. The method according to claim 9, wherein the obtaining a charge volume density of the display particles comprises: estimating a distribution volume of single-color particles; obtaining a total charge quantity of the display particles; and calculating the charge volume density of the display particles according to the distribution volume of the single-color particles and the total charge quantity of the display particles; or wherein the obtaining the charge volume density of the display particles comprises: estimating a distribution volume of first-color particles, a distribution volume of second-color particles, and a distribution volume of third-color particles; obtaining a total charge quantity of the display particles; and calculating the charge volume density of the display particles according to the distribution volume of the first-color particles, the distribution volume of the second-color particles, the distribution volume of the third-color particles, and the total charge quantity of the display particles.

12. The method according to claim 1, wherein the motion simulation step specifically comprises:

for an $i^{th}$ particle, simulating an accelerated motion of the $i^{th}$ particle and refreshing a position of the $i^{th}$ particle, in response to an absolute value of an external electric field force acting on the $i^{th}$ particle being greater than or equal to a sum of an absolute value of a built-in electric field force acting on the $i^{th}$ particle and an absolute value of a resistance acting on the $i^{th}$ particle.

13. The method according to claim 12, wherein the motion simulation step further specifically comprises:

for the $i^{th}$ particle, simulating a decelerated motion of the $i^{th}$ particle and refreshing the position of the $i^{th}$ particle, in response to the absolute value of the external electric field force acting on the $i^{th}$ particle being less than the sum of the absolute value of the built-in electric field force acting on the $i^{th}$ particle and the absolute value of the resistance acting on the $i^{th}$ particle.

14. The method according to claim 13, further comprising:

determining a relationship between i and a total number N of particles in the electronic paper display device after simulating the accelerated motion or the decelerated motion of the $i^{th}$ particle; and assigning a value of i+1 to i and repeatedly performing the motion simulation step in response to i not being equal to N.

15. The method according to claim 14, further comprising:

recalculating the respective charge volume densities of the various charged particles in response to i being equal to N; and repeatedly performing the built-in electric field intensity calculation step, the built-in electric field force calculation step and the motion simulation step based on the recalculated charge volume densities.

16. The method according to claim 15, further comprising:

for the $i^{th}$ particle, determining a direction of motion of the $i^{th}$ particle in response to the absolute value of the external electric field force acting on the $i^{th}$ particle being less than the sum of the absolute value of the built-in electric field force acting on the $i^{th}$ particle and the absolute value of the resistance acting on the $i^{th}$ particle; and determining that the motion of the $i^{th}$ particle stops, in response to a determination of the direction of motion of the $i^{th}$ particle being reverse.

17. The method according to claim 1, wherein the built-in electric field model is:

$$E = m\frac{Q}{s} \&\& \rho_1\rho_2\rho_3$$

where E represents the built-in electric field intensity, m is a predetermined constant, s represents a cross-sectional area parallel to a direction of the built-in electric field of a single display pixel in the electronic paper display device, Q represents the total charge quantity of the various charged particles in the electronic paper display device, $\rho_1$ represents a charge volume density of display particles, $\rho_2$ represents a charge volume density of charged colloidal particles, $\rho_3$ represents a charge volume density of polarization charges, and $\&\&$ is an operational symbol indicating a positive correlation between the built-in electric field intensity E and the charge volume densities $\rho_1$, $\rho_2$ and $\rho_3$ of the various charged particles.

18. The method according to claim 1, wherein the built-in electric field model is:

$$E = m\frac{Q_1(t)}{s} * f_1(t) + m\frac{Q_2(t)}{s} * f_2(t) + m\frac{Q_3(t)}{s} * f_3(t)$$

where E represents the built-in electric field intensity, m is a predetermined constant, s represents a cross-sectional area parallel to a direction of the built-in electric field of a single display pixel in the electronic paper display device, $Q_1(t)$ represents a total charge quantity of display particles at time t, $f_1(t)$ represents a charge volume density of the display particles at time t, $Q_2(t)$ represents a total charge quantity of charged colloidal particles at time t, $f_2(t)$ represents a charge volume density of the charged colloidal particles at time t, $Q_3(t)$ represents a total charge quantity of polarization charges at time t, and $f_3(t)$ represents a charge volume density of the polarization charges at time t, wherein the charge volume density $f_1(t)$ of the display particles at time t is calculated by:

$$f_1(t) = \frac{Q_1(t)}{(V_{P1}(t) + V_{P2}(t))^{z1}}$$

where $V_{P1}(t)$ represents a distribution volume of first-color particles at time t, $V_{P2}(t)$ represents a distribution volume of second-color particles at time t, and z1 is a first volume correction coefficient; and/or the charge volume density $f_2(t)$ of the charged colloidal particles at time t is calculated by:

$$f_2(t) = \frac{Q_2(t)}{(V_{C1}(t) + V_{C2}(t))^{z2}}$$

where $V_{C1}(t)$ represents a distribution volume of positively charged colloidal particles at time t, $V_{C2}(t)$ represents a distribution volume of negatively charged colloidal particles at time t, and z2 is a second volume correction coefficient; and/or the charge volume density $f_3(t)$ of the polarization charges at time t is calculated by:

$$f_3(t) = \frac{Q_3(t)}{(V_{PL1}(t) + V_{PL2}(t))^{z3}}$$

where $V_{PL1}(t)$ represents a distribution volume of positive polarization charges at time t, $V_{PL2}(t)$ represents a distribution volume of negative polarization charges at time t, and z3 is a third volume correction coefficient.

19. An electronic apparatus, comprising:

one or more processors;

a storage device for storing one or more programs, wherein the one or more programs, when executed by the one or more processors, cause the one or more processors to perform the method of claim 1.

20. An electronic paper display device, wherein a relationship between a display grayscale and an external electric field force of the electronic paper display device is determined based on the method of claim 1, wherein the electronic paper display device comprises: a base substrate; a first electrode provided on the base substrate; a second electrode provided on a side of the first electrode away from the base substrate; and charged particles provided between the first electrode and the second electrode; and wherein the charged particles are configured to be driven to a display side under an action of an external electric field applied between the first electrode and the second electrode, so as to achieve a display grayscale meeting the relationship between display grayscale and external electric field force.

\* \* \* \* \*